July 12, 1938.　　　　F. A. HART　　　　2,123,280
TYPEWRITING AND LIKE MACHINE
Filed Oct. 17, 1934　　　9 Sheets-Sheet 6
INVENTOR
FREDERICK A. HART
BY
ATTORNEY July 12, 1938.　　　　F. A. HART　　　　2,123,280
TYPEWRITING AND LIKE MACHINE
Filed Oct. 17, 1934　　　9 Sheets-Sheet 7

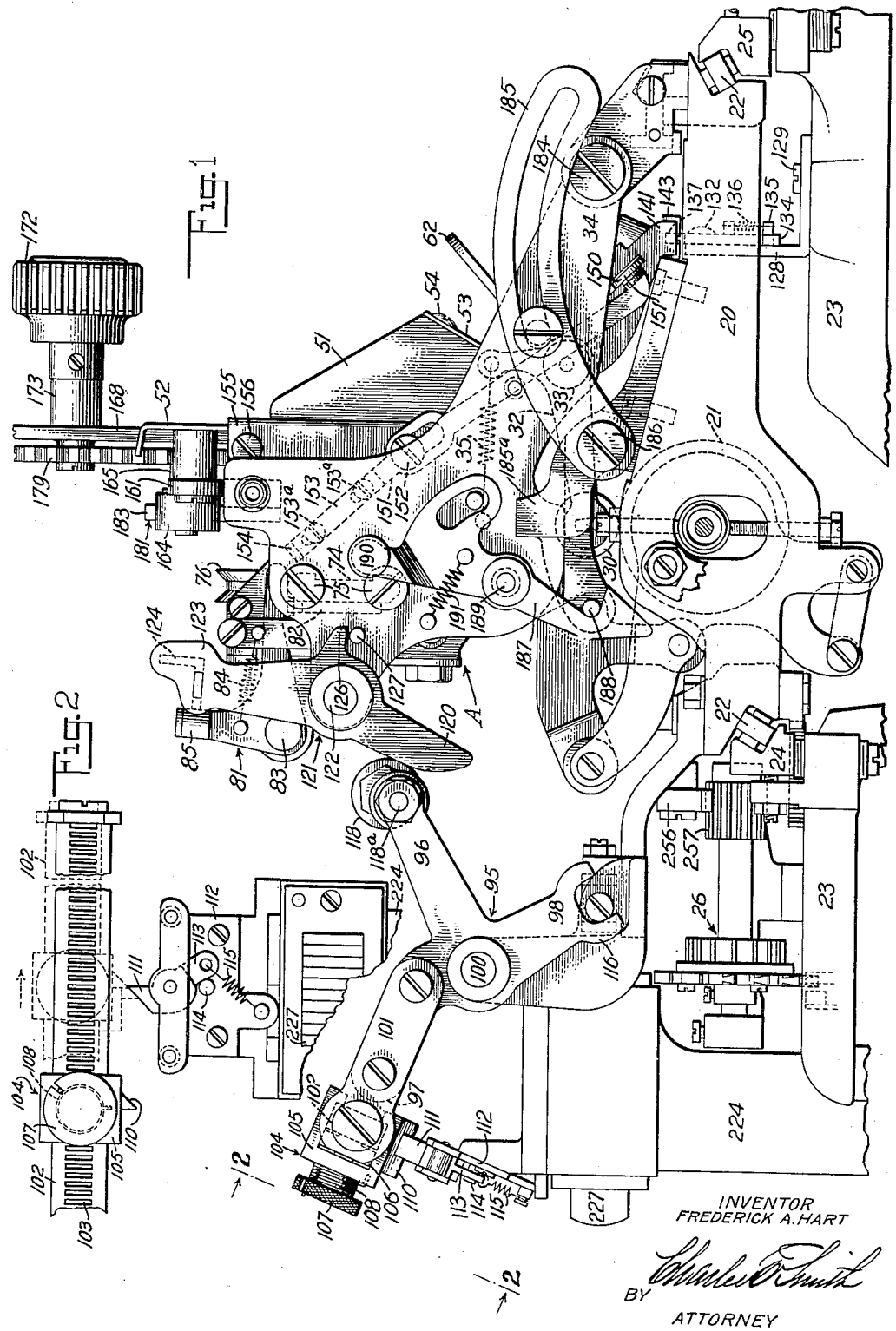

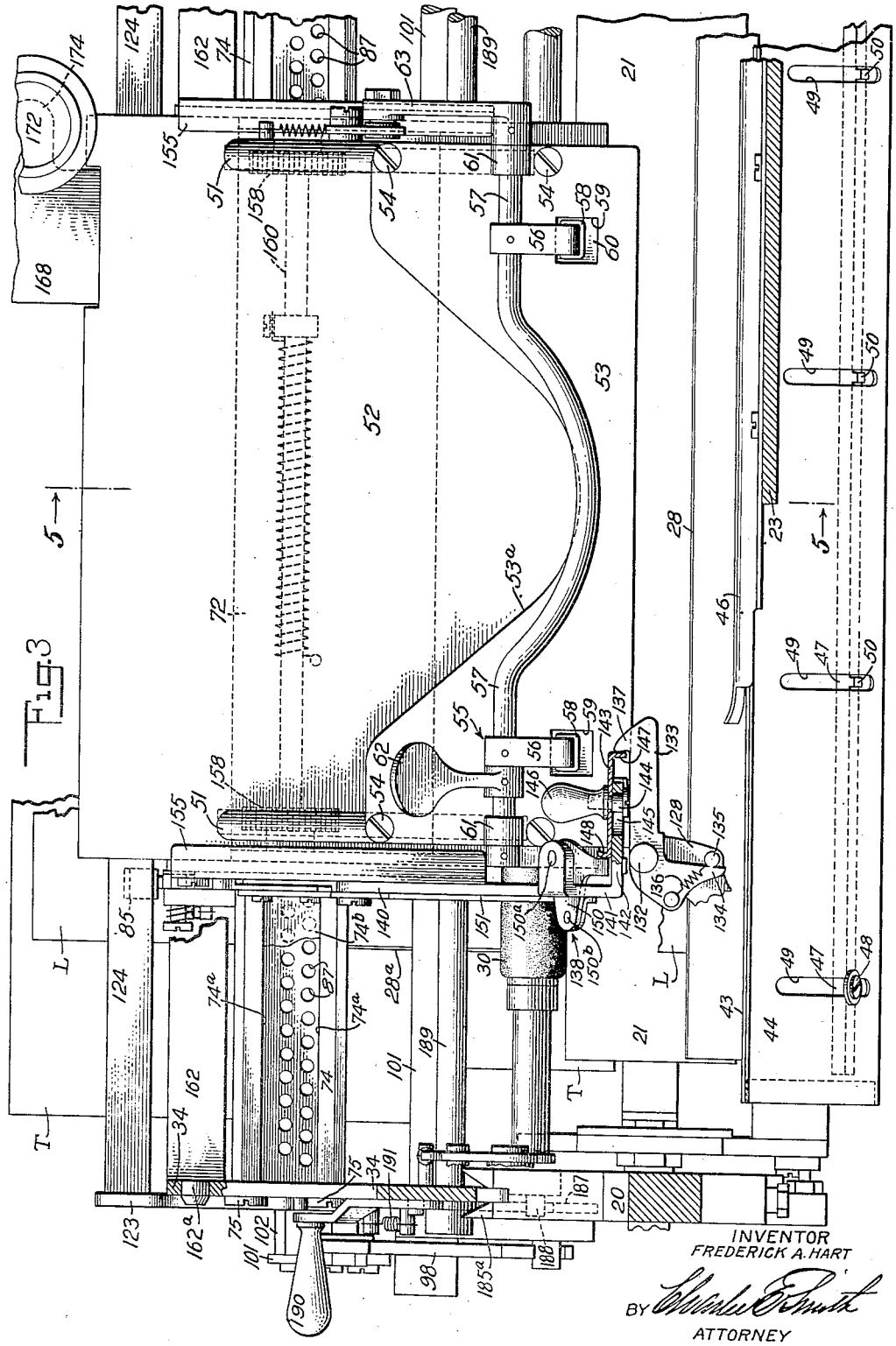

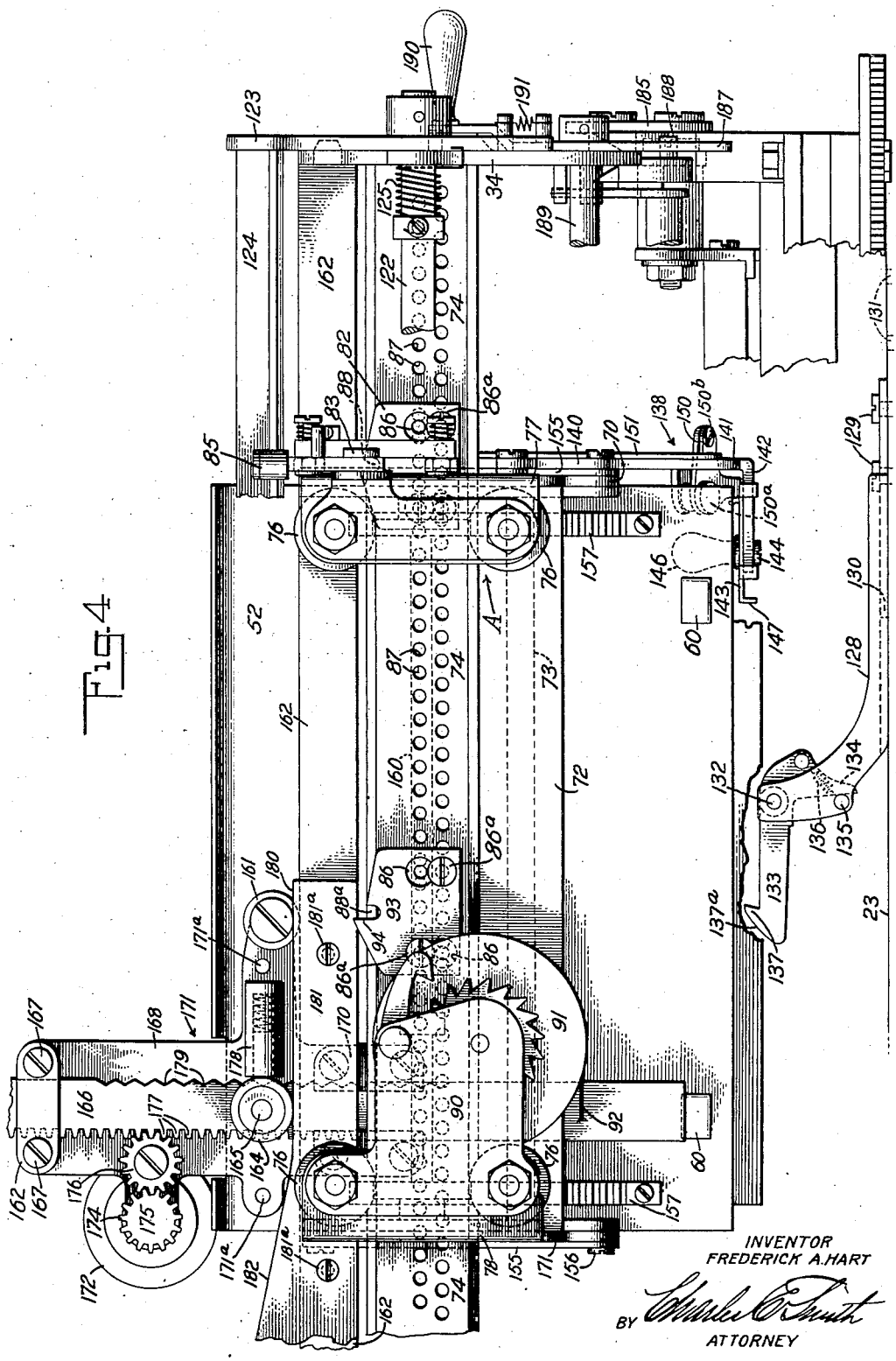

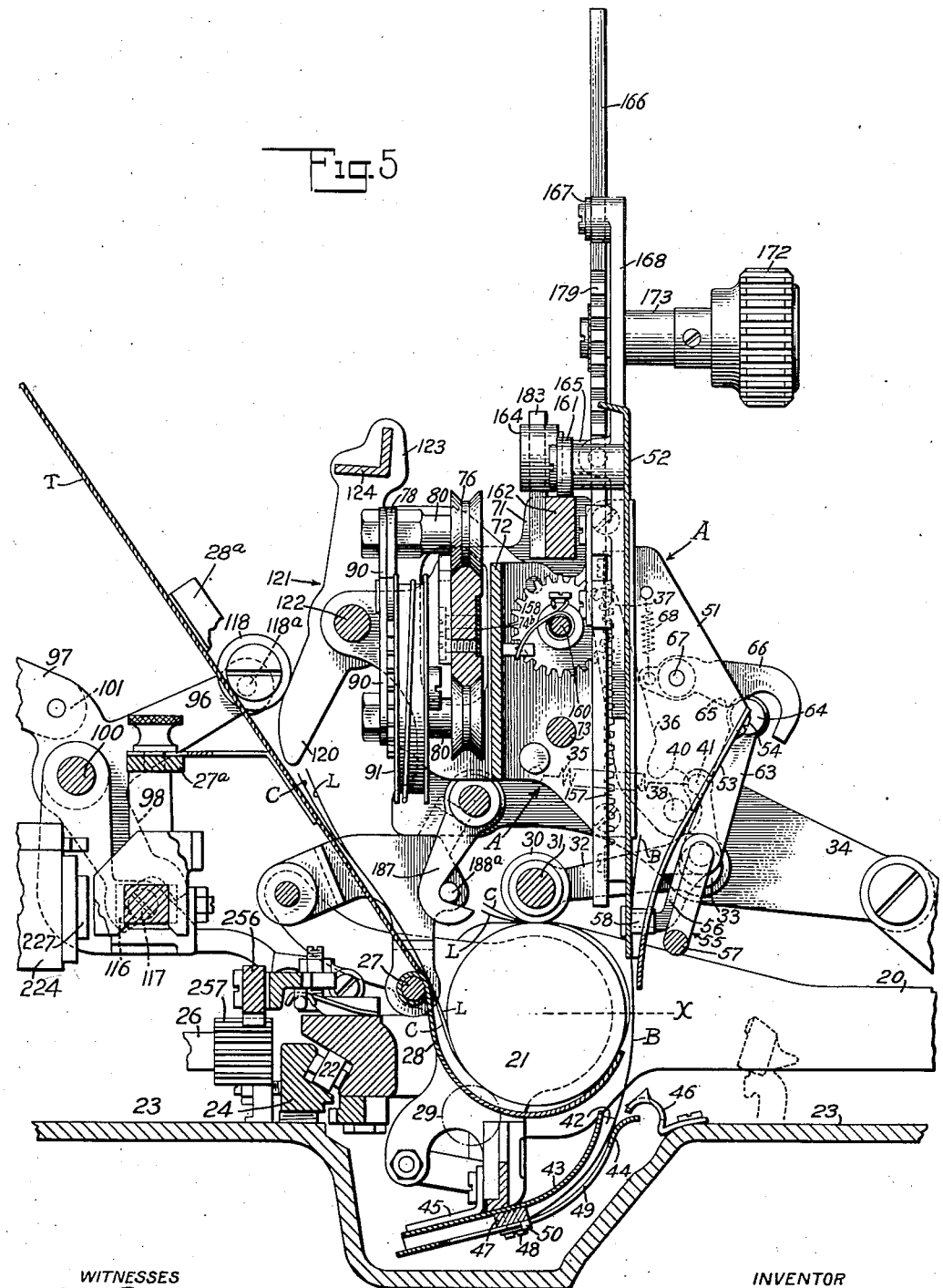

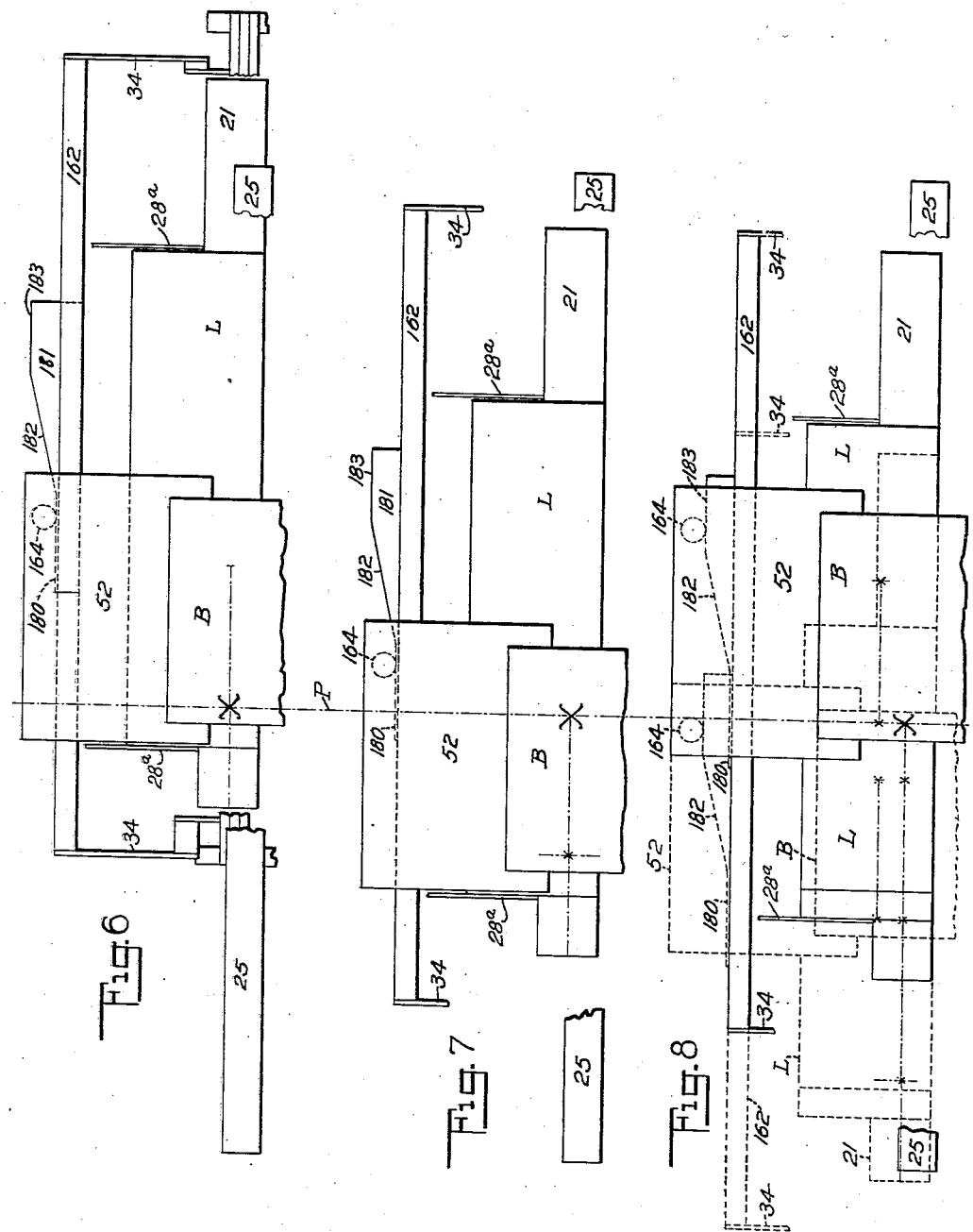

INVENTOR
FREDERICK A. HART
BY
ATTORNEY

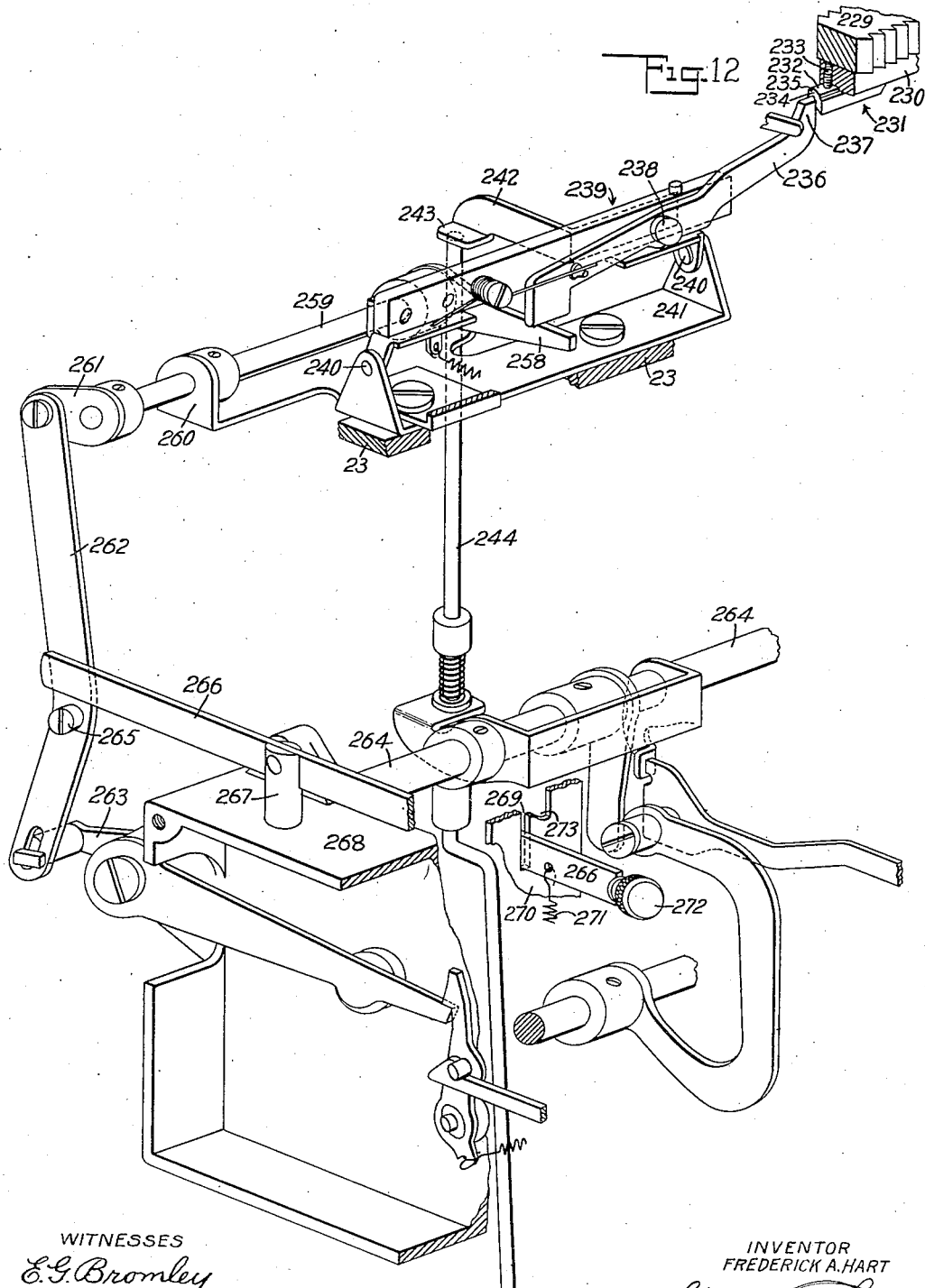

July 12, 1938.   F. A. HART   2,123,280
TYPEWRITING AND LIKE MACHINE
Filed Oct. 17, 1934   9 Sheets-Sheet 9
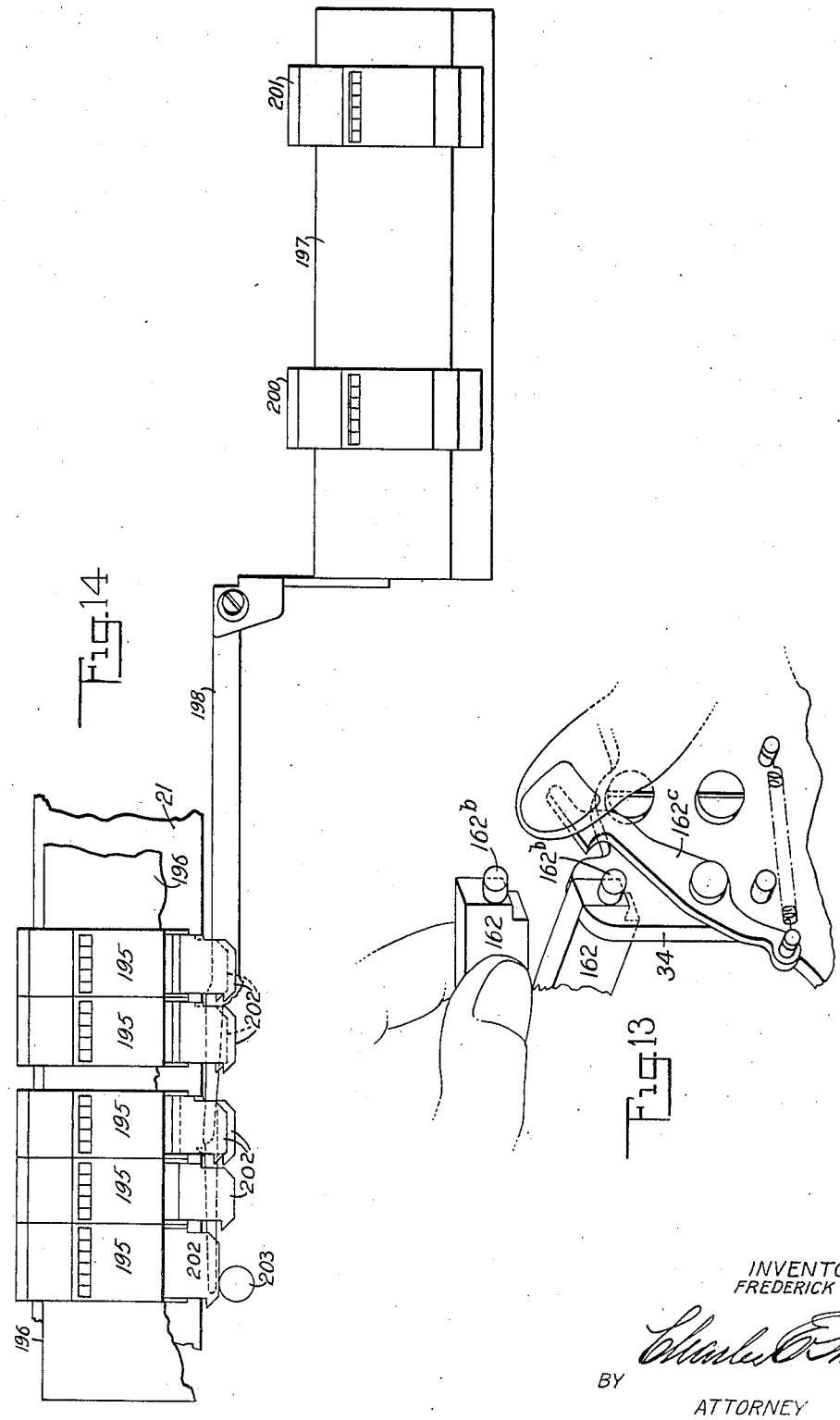
INVENTOR
FREDERICK A. HART
BY
ATTORNEY Patented July 12, 1938

2,123,280

UNITED STATES PATENT OFFICE 2,123,280

TYPEWRITING AND LIKE MACHINE

Frederick A. Hart, Fallbrook, Calif., assignor to Remington Rand Inc., New York, N. Y., a corporation of Delaware Application October 17, 1934, Serial No. 748,694

65 Claims. (Cl. 197—128)

My invention relates to typewriting and like machines and more particularly to so-called billing or bookkeeping mechanism therefor.

One of the primary objects of my invention generally stated, is to provide comparatively simple and yet highly efficient means whereby a comparatively wide record sheet and a comparatively small or narrow customer's bill card or sheet may be printed simultaneously, the entries on the record sheet appearing in one horizontal line while the same entries are made on the bill card in a plurality of lines.

Another object of the present invention is to provide in a typewriting or like machine a platen carriage for receiving the record sheet and an auxiliary superposed carriage for receiving the bill sheet or card, and to provide in such a construction improved means for effecting collating movements of the auxiliary carriage under the control of the platen carriage as the latter moves in the direction of its travel.

Still another object of my invention is to provide in a machine of the character referred to means for automatically and properly collating superposed work sheets, whereby, after the initial insertion of said sheets into the machine, the collating movements thereof are entirely automatic.

A further object of my invention is to provide means of the character specified which are in the nature of an attachment that may readily be applied to or disconnected from a standard typewriting, or combined typewriting and computing machine without modifying or materially modifying the existing structural features thereof.

Another object of my invention is to provide in a machine of the general character referred to above, a work sheet holder constructed and arranged to travel with and independently of the main carriage and in which said work sheet holder receives a bodily line spacing movement in a direction transverse to its traveling movement.

Still another object of my invention is to provide means for automatically controlling a work sheet holder of the character referred to, in its traveling and line spacing movements.

A further object of my invention is to provide adjustable means by which varying extents of line spacing may be readily provided.

A still further object of my invention is to provide adjustable means whereby the above mentioned work sheet holder may be automatically returned to the desired first writing line position after it has completed its line spacing operations.

To the above and other ends which will hereinafter appear, my invention consists in the features of construction, arrangements of parts and combinations of devices set forth in the following description and particularly pointed out in the appended claims.

In the accompanying drawings wherein like reference characters designate corresponding parts in the different views:

Fig. 1 is a fragmentary, side view of the upper portion of a combined typewriting and computing machine equipped with the devices of my invention;

Fig. 2 is an enlarged, detail, fragmentary face view taken in the plane of the line 2—2 of Fig. 1 and looking in the direction of the arrows at said line, the view showing parts of the tripping mechanism forming part of my invention;

Fig. 3 is a fragmentary, detail, front elevational view of the upper left-hand portion of the machine;

Fig. 4 is a fragmentary, detail, rear elevational view of the parts shown in Fig. 3;

Fig. 5 is a fragmentary, vertical sectional view taken along the line 5—5 of Fig. 3 and looking in the direction of the arrows at said line;

Fig. 6 is a diagrammatic front elevational view showing parts at the upper portion of the machine and indicating the initial positions of the platen and auxiliary carriages and their respective record and bill sheets;

Fig. 7 is a view similar to Fig. 6 but showing the position of the parts and work sheets as they appear a letter space before the auxiliary carriage has been returned and the bill sheet has been line spaced;

Fig. 8 is a view similar to Figs. 6 and 7 showing in full lines the positions of the carriages and work sheets after the auxiliary carriage has been returned, and the bill sheet has been line spaced and showing in dotted lines the positions of these parts when the bill and one line on the record sheet have been completed;

Fig. 9 is a fragmentary face view of one form of record sheet intended for use in the machine, and a showing of which aids in arriving at an understanding of the use and operation of the machine and the entry of the items in horizontal lines thereon;

Fig. 10 is a face view of a bill card written in conjunction with said record sheet and indicating how the items of one line on the record sheet are disposed on said bill card in a plurality of horizontal lines;

Fig. 12 is a fragmentary detail perspective view of parts of the automatic tabulator mechanism shown in Fig. 11;

Fig. 13 is a fragmentary detail perspective view of the right-hand end portion of the supporting frame showing the latch and supporting means for the removable cam bar; and Fig. 14 is a fragmentary, diagrammatic front elevational view of the upper portion of the machine with parts removed showing a partial arrangement of the totalizers.

Figure 11:
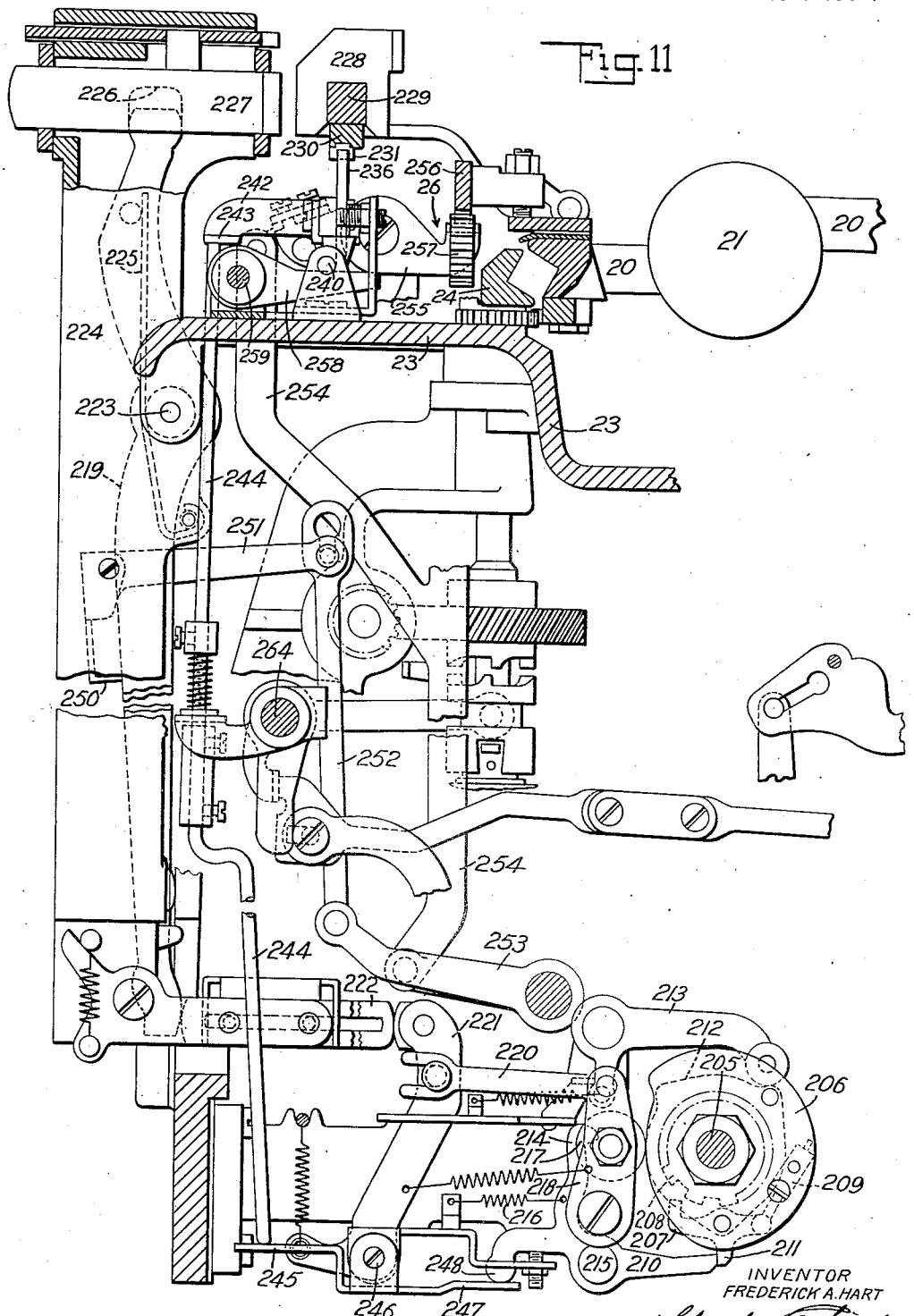
Fig. 11 is a fragmentary, fore and aft vertical sectional view through the rear portion of the machine with parts removed showing the automatic power actuated tabulator mechanism used in conjunction with my invention.

The mechanism of the present invention with the above mentioned objects in view as well as others which will hereinafter appear, may be said to be in the nature of an improvement on the construction shown and described in my co-pending application Serial No. 444,450 filed April 15, 1930, (now Patent No. 2,075,578) and also on that disclosed in the patent to Farnham et al. No. 1,071,612.

The machine to which I have shown the devices of my invention applied in the present instance is a No. 85 Remington electrified bookkeeping machine to which said devices may be readily applied in the nature of attachments, without modifying or materially modifying the existing structural features thereof. It should be understood however, that the invention is not restricted in its use to said machine but may be employed in typewriting, accounting and like machines generally, wherever found available.

The above mentioned Remington machine is disclosed in part in my co-pending application Serial No. 510,941 filed Jan. 24, 1931, (now Patent No. 2,063,737) and only so much thereof is disclosed as is necessary to illustrate my invention in its embodiment therein.

While the machine of the present invention is capable of a wide range of uses, it will be sufficient if I first give a general and brief description of one of such uses and describe briefly how it is carried out; thereafter describing in detail the construction and operation of the machine in connection with the particular use set forth, by way of example.

The example taken concerns a form of billing and office recording used by power companies and involves the use of a bill card or sheet B and a record, "customer record" or ledger sheet L as illustrated in Figs. 9 and 10. It will be observed that the sheet L is divided into several vertical columns for the entering of meter readings, consumptions, rates, charges, taxes, amounts, etc. and each column contains a suitable caption at the head thereof. Instead of using a bill sheet of the same width as the sheet L, it is customary in this form of billing to have the customer's bill in the form and size of an ordinary postal card, the bill in fact being made out on a postal card. Hence, it becomes desirable to dispose the items of one comparatively long horizontal line on the record sheet in a plurality of comparatively short horizontal lines on the bill card. In the present instance, as shown in Fig. 10, two such horizontal relatively short lines are used on the bill sheet, the first of which contains entries corresponding to the first six items on the record sheet, the remaining items being disposed on the second line of the bill sheet. Obviously, however, this arrangement may be varied in accordance with the specific requirements in any individual case.

By the use of the devices of my invention, I provide simple and effective means by which a bill card or sheet and the record sheet may be printed simultaneously through the medium of an interposed carbon sheet, the entries appearing on the card and record sheet as shown in Figs. 9 and 10. Such means include a bill carrying auxiliary carriage mounted on the platen carriage for step-by-step letter spacing travel or movement therewith and for independent return movement or travel along the same to bring the bill card into registry with another part or vertical column on the record sheet for the entry of the second series of items. The line spacing of the bill card is effected through the medium of a paper table or work sheet holder which is carried by the auxiliary carriage, such line spacing being brought about by a bodily movement of the work sheet holder in a direction transverse to its line of travel. The line spacing is effected by contact of a roller on the paper table with a cam or inclined camming rail, trackway or member fixed on the platen carriage and as the auxiliary carriage moves relatively thereto. All movements of the auxiliary carriage and its associated paper table are in the present instance, entirely automatic and under the control of the platen carriage, though the paper table may be shifted and adjusted manually when it is deemed necessary or desirable.

With the foregoing preliminary description I shall now describe in detail the present embodiment of my invention in the hereinbefore mentioned Remington machine.

Referring to Fig. 1 it will be observed that the usual platen carriage 20 in said machine carries a cylindrical platen 21 and is mounted on roller bearings 22 to travel over the top plate 23 of the machine from side to side thereof, the bearing rollers being supported in the grooved ways in fixed guide rails 24 and 25 secured to the top plate of the machine. The carriage is spring impelled in the direction of its feed by the usual spring drum (not shown) under control of the usual escapement mechanism 26 and intervening feed rack and pinion etc. A step-by-step letter space advance of the carriage is effected in the usual manner during the operation of the type bars one of which is shown in Figs. 5 and 11. The platen is line spaced automatically in the usual manner in conjunction with the usual power actuated automatic carriage return mechanism, employed in said Remington machine and disclosed in part at least in my application Serial No. 538,725 filed May 20, 1931 (now Patent No. 1,978,997).

Arranged beneath the platen and attached at the rear thereof to a fixed cross bar 27 is a curved paper deflector 28. A paper table T of any suitable construction and provided with the usual adjustable side edge guides 28ᵃ is detachably supported on a removable cross bar 27ᵃ at the rear of the machine as shown in Fig. 5. This paper table is arranged to lead into the space between the deflector 28 and the platen, and together with said deflector provides an entrance at the rear of the platen for a ledger or record sheet L, and a carbon sheet C, substantially co-extensive in size therewith, by which a manifold copy of the items written on the bill sheet may be produced on the ledger sheet. Of course a carbon sheet co-extensive in size with the bill card may be employed, in which case the carbon sheet will be introduced into the machine with the bill card or sheet. In accordance with the method first described above the record sheet and carbon sheet are introduced into the machine from the rear of the platen with the aid of the paper table T and into the space between the platen and the deflector 28, being carried around in front of said platen by feed rollers 29.

Both the record and carbon sheets, in the present instance, pass beneath paper feed rollers 30 which bear on the top of the platen. These feed rollers 30, preferably four in number, are mounted in the usual manner for adjustment along a rod 31 which constitutes a cross bar of a supporting bail. The rod 31 extends across the width of the platen carriage and is supported at the ends thereof by the rearwardly extending arms of a pair of bellcrank levers 32 which are pivotally mounted at 33 in two side plates 34 of a pivoted supporting frame for an auxiliary carriage, as will be hereinafter more fully described. A pair of tension springs 35 exert a counter-clockwise urge (Fig. 5) on the bellcranks 32 which effectively holds the feed rollers 30 against the platen or the sheets C and L thereon. In order that the feed rollers 30 may be raised from the platen when desired, I provide a lever 36 having a finger piece or handle 37 at its upper end and pivoted to one of the side plates 34, at 38. Said lever 36 has a cam surface 40 near its pivot point which cooperates with a pin 41 on the upwardly extending arm of one of the bellcranks 32, so that when the lever is moved forward the feed rollers 30 will be lifted against the tension of the springs 35.

As shown in Fig. 5 the outermost or primary bill or work sheet B which is carried by an auxiliary carriage is introduced into said carriage as will hereinafter appear with its lower end foremost and into the open mouth of a channel 42 provided between an upper paper deflector 43 and a lower deflector 44. These deflectors 43 and 44 may be secured to one of the under cross members of the platen carriage by means of brackets 45. Still another deflector 46 is secured to the top plate 23 to the right of the usual center type guide in order to prevent improper insertion of the bill card B into the space between the deflector 44 and the top plate 23 and to facilitate the introduction of said card into the channel 42, when the carriage 20 has been moved to the right. An adjustable stop member 47, shown in Figs. 3 and 5, is mounted in and extends longitudinally along the channel 42. This provides a means for properly positioning the sheet or card B vertically upon its initial insertion into the machine and for squaring it with reference to the printing line indicated by the dotted line X in Fig. 5. This stop may be fastened in its adjusted position in the channel 42 by means of clamping screws 48 passing through elongated slots 49 in the lower deflector 44, with lugs 50 on the stop member also serving to guide said member as it is adjusted up or down within the channel and maintaining it parallel with reference to the printing line. It will be observed that by means of the elongated slots 49 and the screws 48, the stop member 47 may be moved up and down to allow the use of cards or sheets of different length or to predetermine the first printing line position on a card. When a bill card or sheet B is inserted into the machine, it merely needs to be pushed into the channel until the lower end thereof abuts the stop 47. With said stop properly adjusted, it will be known that when the card is arrested thereby, it is correctly positioned and squared with respect to the printing line to receive the first line of writing.

As hereinbefore indicated the bill sheet B is carried by an auxiliary carriage which is designated as a whole by the reference letter A and may be of any width according to the bill sheets to be carried thereby. In any event, however, said auxiliary carriage is materially narrower than the main or platen carriage hereinbefore described, in order that it may receive a traveling movement on the platen carriage to impart automatic collating movements to the narrower sheet B relatively to the record sheet L. Generally speaking this auxiliary carriage comprises a truck which is superposed on and fitted for traveling movement along a supporting rail mounted in the side plates 34 of the pivoted supporting frame, and a work sheet holder carried by said truck and having a line spacing movement in a direction transverse to the direction of travel of the truck. The truck may be coupled to the main carriage for joint movement therewith by means of a latch on said truck which is adapted to engage successively a series of stops or cooperative locking members fixed at predetermined intervals along the supporting rail. Upon being automatically released from one of these stops by a tripping member the truck moves along its rail to the right relative to the main carriage, under the urge of a spring drum or motor, until it is arrested by the next of said stops. During such relative movement, the work sheet holder is automatically and bodily raised in a line spacing direction any predetermined distance by means of a roller carried by and adjustable on said work sheet holder and cooperating with a cam on the supporting rail. The auxiliary carriage A may be fitted for any number of these relative traveling movements and the consequent bodily line spacing of the work sheet holder; the number depending on the particular type of work the machine is set up for. It is this auxiliary carriage, which is to be hereinafter more fully described, and through the relative traveling movements between it and the platen carriage, automatically collates the bill sheet B with reference to the sheet L at the proper time during the course of making a series of entries thereon.

I will now describe the specific construction and arrangement of parts by which the auxiliary truck and work sheet holder above referred to are controlled, and how the bill sheet B is carried by the latter.

As indicated in Figs. 3 and 5 there are two side edge guides or gages 51, which may be triangular or wedge shaped, on the auxiliary carriage A, said gages being spaced apart to correspond to the width of the bill card or auxiliary work sheet and between which the bill card is received and by which it is guided. Each of these side guides is attached by any suitable means to a work sheet holder, or paper table 52 on which a bill card is adapted to rest and be supported. In addition to this support, the side guides 51 are further held rigid by a front supporting member 53 which may be secured to the guides 51 by any suitable means, such as screws 54. The wedge shaped side guides 51 together with the paper table 52 and front supporting member 53 form a chute whose bottom opening leads into the mouth of the channel 42 to facilitate in the easy insertion of a bill card or sheet B, as clearly depicted in Fig. 5.

When a bill card B is inserted into the machine, it is dropped or placed into the above described chute and pushed downwardly into the channel 42 until arrested by the stop member 47; that is assuming that the work sheet clamping means to be hereinafter described has been released. In order that the bill card may be moved downwardly as far as is necessary, and that such operation may not be hindered by the supporting member 53, said member is cut away at 53ª, as illustrated in Fig. 3. When the bill card is thus in its proper initial position it is desirable to clamp it in such position in order to receive a line spacing movement with the paper table 52 and in order to cause the bill card to travel with the auxiliary carriage in the independent movement of the latter, as will hereinafter appear.

To attain these ends, I provide a suitable clamping member which is designated as a whole by the reference numeral 55, and which in the present instance comprises two clamping arms 56 fixed on a rock shaft 57. The clamping arms 56 are bent rearwardly at their lower clamping ends and may be provided with rubber or cushion covers 58, said lower ends being adapted to pass through openings 59 in the support 53 and seat in indentations 60 (Fig. 4) in the paper table 52 when the rock shaft 57 is turned in a clockwise direction, Fig. 5. The rock shaft 57 is journalled in bearings 61 provided at either side of the supporting member 53 and may be oscillated between clamping and non-clamping positions by a finger piece 62 secured to the rock shaft. A crank arm 63 having a roller 64 at one side of its extremity is provided on one end of the rock shaft 57. This roller cooperates with a cam 65 on an edge of a latching member 66 pivoted at 67 to one of the side guides 51, said cam bearing against the roller under the tension of a spring 68. Fig. 5 shows the parts in clamping position with the roller 64 on the right-hand side of the high point of cam 65. To release the clamp, the finger piece 62 is lifted forcing the roller 64 to the other side of the high point of the cam 65 against the tension of the spring 68. This construction enables the clamp to be retained in its released position.

The auxiliary carriage or truck by which the paper table 52 and its associated parts are carried comprises end plates 70 and 71 rigidly united and held spaced apart by a suitable flanged cross plate 72 and supporting rod or bar 73. The end plates 70 and 71 are mounted on the flanges of the cross plate 72 by any suitable means, such as rivets. As shown in Fig. 4 the auxiliary carriage or truck is supported on and adapted to travel along a cross bar or supporting rail 74 that in normal position is arranged above the platen and parallel to the axis thereof. Said rail extends substantially throughout the length of the platen carriage and is fixed at its ends by screws 75 (Fig. 1) to the end plates 34 of the swingable supporting frame, and may be regarded as a part thereof. In the present instance the auxiliary carriage is supported to travel along the cross rail 74 by four grooved rollers 76 carried by the auxiliary carriage and which coact with the opposite V-shaped edges of the cross rail. A pair of rollers is supported on each of two inwardly extending flanges or ears 77 and 78 formed, in the present instance, integral with the end plates 70 and 71 respectively. Each of the flanges 77 and 78 has two spindles 80 detachably secured thereto and projecting forwardly therefrom. The forward end of each spindle is provided with bearings for anti-friction balls that provide a ball bearing for the associated bearing roller 76. Thus the auxiliary carriage is fitted for traveling movement along the rail 74, such movement being relative to the platen carriage.

The so-called supporting frame comprising the end plates 34, rail 74 etc. is arranged above the platen and normally has a fixed relation to the platen carriage, and in a measure may be regarded as a part thereof, though I prefer to pivot the supporting frame to said carriage, as will hereinafter appear in order that said frame and the auxiliary carriage carried thereby may be turned forward to give access to the platen and paper table and provide for the ready introduction of the record and carbon sheets from said paper table into the space between the deflector 28 and the platen.

Preferably the front face of the rail 74 is depressed and has undercut edge portions 74ª (Fig. 3) for the reception of an index strip 74ᵇ. Said strip may be provided by cutting the column designating heading from a record sheet and inserting it in place between the undercut edges 74ª of the rail 74. Suitable means on the auxiliary carriage may coact with said index strip to locate the auxiliary carriage relatively to the main carriage. However, inasmuch as the auxiliary carriage in the present construction is automatically located with reference to the main carriage in the different positions said auxiliary carriage may assume there is but little necessity for the use of the index strip.

Having thus described the general construction of the auxiliary work-sheet-carrying carriage and how it is fitted for traveling movement relative to the platen carriage, I shall now describe how and when such relative movement is effected.

It may be assumed that normally the auxiliary carriage occupies a position at or near the left-hand end of the rail 74, Fig. 3, and that the platen carriage is at the extreme right-hand end of its travel. The auxiliary carriage is maintained connected to the platen carriage in such position by engagement of a latch or locking member 81 (Figs. 1 and 4) on the auxiliary carriage with a notched stop or companion locking member 82 mounted, in the present instance, on the rail 74 of the supporting frame. As shown this latch 81 takes the form of a bellcrank lever pivoted at 83 to a projection on the side plate 70. The forwardly extending arm of said latch is adapted to cooperate with the stop 82 and is constantly urged in a downward or engaging direction by a spring 84. The upwardly extending arm of said latch 81 is provided with a roller 85, the purpose of which will hereinafter appear.

The stop 82 with which the forwardly extending arm of the latch member 81 cooperates comprises in the present instance, a small flat plate having four countersunk borings 86 therein, as shown in Fig. 4. The rail 74 is provided with two parallel horizontal rows of tapped openings 87 of the same size as those in the stop. The tapped openings in each row of the rail are two tenths of an inch apart and the rows are so staggered that the horizontal distance between the center of a boring in one row is one tenth of an inch from the center of either of its adjacent borings in the other row. The locations of the borings 86 in the stop are such that said stop may be secured to the rail 74 by means of screws 86ª registering with diagonally opposite borings 86 and with two of the tapped openings 87 in the rail 74. It will be apparent that with such a construction the stop 82 may be adjusted throughout the length of the rail to positions one tenth of an inch apart, such distance being that of the ordinary letter space.

A notch or indentation 88 with which the forwardly extending arm of the latch engages is provided in the upper edge of the stop or locking member 82 substantially at the center thereof, said upper edge projecting slightly above the top edge of the rail 74. In order that the latch may be lifted and cammed into the notch 88 of the stop as the auxiliary carriage approaches it from either side, the upper edge of said stop may be inclined downwardly on both sides away from the notch to provide for said camming action. As the parts are shown in Fig. 4 the left-hand side of the notch 88 may be slightly higher than the right and the incline of the edge sloping away therefrom will consequently be greater. Such a construction will insure an engagement of the latch 81 with the notch 88.

Pivoted to a bracket plate 90 (Figs. 4 and 5) which is attached to the inwardly bent flange 78 on the auxiliary carriage is a motor or spring drum 91 of usual construction and having the cord 92 thereof connected at one end to the drum and connected at its other end to the right-hand plate 34 of the supporting frame, the construction being such that the auxiliary carriage is under a constant urge to move to the right in Fig. 3. Therefore, when the auxiliary carriage is in an arrested position near the left-hand end of the platen carriage with the latch 81 engaging the stop or locking member 82, if said latch is raised, the auxiliary carriage will spring to the right under the urge of the spring drum 91. Such movement will continue until the latch 81 is arrested by another stop or locking member 93 of similar construction to the stop 82 and likewise positioned on the rail 74 at any desired point, but toward the other end of the platen carriage from the stop 82. This stop 93, which may be termed a "final" stop or locking member, in that the latch 81 cannot move beyond it, corresponds in all its details to the stop 82, except that the right-hand side 94 of the notch 88ª (or the left-hand side thereof as the parts appear in Fig. 4) is higher than the corresponding part of the stop 82. This raised portion 94 constitutes an abutment beyond which the latch 81 cannot move to the right although the platen carriage may be moved to the right independently of the auxiliary carriage after the latch 81 engages the abutment 94, as will hereinafter appear. Although, in the present instance I have shown only one of the stops 82 used on the rail 74, it is to be understood that more of such stops may be used, the amount depending on the number of times it is desired to have the auxiliary carriage travel to the right independently of the platen carriage for any particular type of work before being finally arrested by a stop like the stop 93.

From what has been pointed out above it will be understood that in the present instance, the distance between the notches of any two stops on the rail 74 will correspond substantially to the length of the line typed on the bill sheet B before the auxiliary carriage is returned which line of course, will be materially shorter than a line on the record sheet. And further, it will be understood that the latch 81 and notched stops 82 and 93 constitute automatically operating locking or connecting means that connect or lock the platen carriage and auxiliary carriage to travel together in both directions and that a relative travel between the carriages cannot be effected until such locking means are released in a manner which will hereinafter appear.

As previously pointed out, according to the present invention it is desired to effect an automatic collation of the work sheets and this may be accomplished by means of an automatic relative traveling movement between the platen and auxiliary carriages. I have thus far shown how the auxiliary carriage is coupled, latched or connected to travel with the platen carriage and how said auxiliary carriage will spring to the right along the rail 74 under the urge of the spring drum 91 when the latch 81 is released from the stop 82. I will now describe how this unlatching is effected automatically.

The main or platen carriage is tabulated automatically after the entering of each item by an automatic tabulating mechanism of the character disclosed in the co-pending application of Dodge and Philbin, filed Aug. 11, 1934 and bearing Serial No. 739,384 (now Patent No. 2,064,154) although any suitable automatically operating tabulating mechanism may be employed. This mechanism is shown in part in Figs. 11 and 12 and will hereinafter be more fully described. It will suffice for the present to say that the auxiliary carriage functions in combination with this automatically operating tabulating mechanism to receive its automatic shifting movement relative to the platen carriage.

There are two separate trains of devices by which the latch 81 is automatically controlled. I will first describe one of these trains and will subsequently describe the second train.

Referring to Fig. 1 it will be seen that a pair of three-armed levers 95, having forwardly, rearwardly, and downwardly extending arms 96, 97 and 98 respectively, is fixed to the ends of a rock shaft 100. Said shaft is mounted in supporting brackets which are secured to and extend backward from the rear cross bar of the main or platen carriage 20; the shaft extending longitudinally substantially throughout the length of said carriage. Each of the rearwardly extending arms 97 has an arm 101 secured thereto which carries a rack bar 102 having a series of indentures 103 therein, as shown in Fig. 2. This rack bar extends throughout the length of the main carriage and has mounted thereon for sliding adjustment a tripping device designated as a whole by the reference numeral 104. Said device comprises a yoke 105 which embraces the rack bar and a releasable detent 106 which engages with the indentures 103 to hold the tripping member in its adjusted or set position. A thumb screw 107 is loosely threaded into a tapped opening in the yoke 105 and at its inner end is received in an opening in and bears against the detent 106 forcing it into one of the indentures 103. A spring 108 is coiled around the stem of said screw, one end of the spring being anchored to the yoke and the other end being secured to the screw and exerting its force to turn the screw and thus force the detent into locking position.

Extending downwardly from the lower face of the yoke 105 is a tripping cam 110 which, during the movement of the tripping device 104 in the direction of the arrow in Fig. 2, is adapted to cooperate with a trip pawl 111 pivoted to an extension 112 on the usual decimal tabulator stop frame located centrally at the rear of the machine. This pawl 111 is normally held in a substantially perpendicular operative position and against clockwise rotative movement (as the parts are shown in Fig. 2) about its pivot by contact of an arm 113 on said pawl with a stop 114. A spring 115 resiliently holds the pawl in this operative position. The relation of the cam 110 and pawl 111 is such that as the platen carriage moves to the left (to the right in Fig. 2) carrying the cam past the pawl, said cam will engage said pawl and thus raise the rack bar 102 a short distance. As the cam moves past the pawl the rack bar will drop back to its normal position, said normal position being determined by the contact of one of a pair of fingers 116 on the downwardly extending arm 98 with a stop screw 117 on the platen carriage frame 20. This short up and down movement of the rack bar 102 takes place during a movement of the platen carriage as it travels to the left under the action of the automatic tabulator mechanism. As shown in the present instance it requires but a single letter space movement of the platen carriage to complete the up and down movement of the rack bar 102 with the aid of the trip devices. This movement of the rack bar 102 is transmitted in a manner to be presently described to release the latch 81 in order that the auxiliary carriage may jump to the right with an independent movement. Due to the fact that it requires but a single letter space movement of the platen carriage to bring about a release of the latch 81, it will be understood that in the event that an automatic tabulation over a single letter space say, from the last written digit in one column to the first digit in the next, is required; the automatic release of the latch 81 will, nevertheless, be effected.

It will be understood that during the return movement of the platen carriage from left to right the cam 110 will coact with the opposite side of the pawl 111 and turn it against the force of its spring 115 thus passing the pawl without effecting a raising of the rack bar 102 and without releasing the locking latch 81 controlled thereby.

I will now describe the means by which movement is transmitted from the rack bar 102 to the latch 81 to release it.

Each of the forwardly extending arms 96 of the levers 95 has a roller 118 mounted thereon which cooperates with one arm 120 of an angular lever 121. The support for each roller 118 is adjustable around an eccentric center 118ª where connection between the support and its companion arm 96 is effected. The angular levers 121 are fixed on the ends of a rock shaft 122 which extends through the length of the platen carriage and is supported for turning movement in the end plates 34 of the supporting frame. Each of the angular levers 121 has an upwardly extending arm 123, and together said arms 123 constitute a support for a latch release bar 124, which is L shaped in cross section. A spring 125 (Fig. 4) encircling the rock shaft 122 tends to turn said rock shaft and the associated angular levers 121 and latch release bar 124 in a clockwise direction as the parts are shown in Fig. 1. One of the arms 123 has a projection 126 that coacts with a stop pin 127 on the end plate 34 in order to limit the movement of the parts under the action of the spring 125. In such position the rear edge of the latch release bar is in readiness to engage the roller 85 of the latch 81 should said bar be moved rearward against the tension of the spring 125.

The construction of the foregoing train of connections between the cam 110 and the latch release bar 124 and roller 85 is such that as said cam passes over the pawl 111 during the travel of the platen carriage from right to left the following movements will take place. The three-armed levers 95 are turned a short distance in a clockwise direction (Fig. 1) with the rock shaft 100 to effect a consequent downward movement of the rollers 118. These rollers engaging the arms 120 of the angular levers 121 bring about a counter-clockwise movement thereof and a consequent rearward movement of the latch release bar 124. Such movement causes said bar to engage the roller 85 on the latch 81 to effect a counter-clockwise movement of said latch on its pivot 83 and a consequent release of said latch from the stop or locking member 82. This results in releasing or disconnecting the auxiliary carriage from the platen carriage and allows the former to effect an independent return travel on the rail 74 until arrested by contact of latch 81 with the stop 93, all as hereinbefore described.

Thus, it will be apparent that by setting the tripping member 104 at any predetermined place along the rack bar 102, the auxiliary carriage may be released automatically for independent return movement at any desired point in the travel of the platen carriage. It will also be apparent that any desired number of tripping devices 104 may be used, the number depending on the number of times it is desired to effect a release of the auxiliary carriage from the stop or stops that cooperate with the latch 81 to couple the two carriages to travel together in their movement from right to left.

In the present instance, however, only one tripping device 104 is used on the rack bar 102 since the entries made on one horizontal line of the ledger or record sheet L are to be condensed into only two horizontal lines on the bill card B, and hence only one independent return travel of the auxiliary carriage is required.

When a complete line of entries has been made on the ledger or record sheet, the main carriage will be automatically returned and the platen line spaced by the usual automatically operating power actuated carriage return mechanism hereinbefore referred to in order to place the machine in condition for a new line of entries, or in some instances for the removal of the record or ledger sheet on which the entries have been made and the introduction of a new record sheet. During this return movement of the main or platen carriage the auxiliary carriage is also returned with it to its starting position where it is arrested in proper position with reference to the printing point by means to be hereinafter described, while the platen carriage continues its movement independently thereof to bring about the initial relative positions between said carriages, with the auxiliary carriage located near the left-hand end of the platen carriage. The parts will then be positioned to have a new bill card inserted in the work holder for another group of entries. The mechanism for accomplishing this return movement of the auxiliary carriage and the movement of platen carriage relatively thereto, and in which is included the second train for releasing the latch 81, will now be described.

Before the main carriage is returned for a new line of entries the auxiliary carriage is in its shifted position near the right-hand end of the rail 74 at a time when the latch 81 engages the locking member 93. Therefore when the main carriage is returned to the right the auxiliary carriage will be returned with it until the former is arrested and is held stationary with respect to the machine frame, the main carriage continuing its return movement relatively to the auxiliary carriage. When the latch 81 reaches the stop 82 during this return movement of the platen carriage relatively to the arrested auxiliary carriage the locking means will be automatically controlled to bring about a reengagement of the latch 81 with the member 82 and thus the auxiliary carriage will be re-coupled with the platen carriage in its initial position at the left of the platen carriage, as will more clearly appear from the following.

To effect the holding of the auxiliary carriage and afford a relative return movement of the main carriage, there is provided a bracket 128 (see Figs. 1, 3 and 4) which is adjustably secured to the top plate of the machine by means of screws 129 passing through a slot 130 in the foot of said bracket into threaded borings 131 in said top plate. These means afford an adjustment of the bracket 128 right or left in the direction of the travel of the carriages. Pivoted at 132 to the bracket 128 is a holding member or abutment 133 which is held against clockwise rotative movement (Fig. 4) by contact of a projection 134 thereon with a stop pin 135 on the bracket 128, and which is resiliently maintained in a substantially horizontal position by means of a spring 136. A hook or arresting portion 137 on said holding member cooperates with an unlatching or releasing device mounted on the supporting plate 70 of the auxiliary carriage and designated as a whole by the numeral 138. This unlatching device comprises a special bracket plate 140 secured to the side plate 70 and having a downwardly and forwardly extending portion 141. As shown in Figs. 3 and 4 the said forwardly extending portion 141 of the bracket plate 140 is bent inwardly in a horizontal plane to form a supporting arm 142 for a sliding member 143. A sliding member is mounted on the support 142 by means of a headed, shouldered screw 144 passing through a slot 145 in said support, the threaded end of said screw engaging a tapped opening in a finger piece 146. The right-hand end (Fig. 3) of the sliding member 143 is bent downwardly to form a contact lug 147 which cooperates with the hook or abutment 137 of the holding member 133 and the left end of said member 143 is bent upwardly to form an ear 148 which cooperates with one arm of the bellcrank lever 150. Said bellcrank 150 is pivoted at 150ª to an inwardly bent ear on the portion 141 of the bracket plate 140 and the other arm thereof passes through a slot in the portion 141 and is pivoted at 150ᵇ to a link 151. The link 151 lies flat against the plate 140 upon which it is slidably supported, as at 152 (Fig. 1), and is provided with an end portion 153 adjustable longitudinally on the link 151 and held in its adjusted position by clamping screws 153ª. A laterally bent contact surface 154 is provided at the rearward extremity of the portion 153 and said contact surface is adapted to engage the forward end of the latch 81 to raise said latch, thereby releasing it from engagement with the coacting locking member 93.

The entire construction of the unlatching, releasing or unlocking device 138 is such that when the slidable member 143 is moved to the left (Fig. 3) by contact lug 147 engaging with the hook 137 at a time when the platen and auxiliary carriages are moved together to the right, the bellcrank 150 will be turned to move the link 151 upward and rearward and consequently release the latch 81 from engagement with the coacting locking member 93. The parts may be adjusted to raise the latch only far enough to escape over the right-hand side of the notch 88ª (Fig. 4) and hence when the arrested auxiliary carriage is released by the unlatching or releasing lever 138, the platen carriage may be moved to the right independently thereof, the wall 94 of said notch at this time moving to the right away from the latch 81.

It will be understood that the timed relation of the above mentioned parts is such that the automatic release of the latch 81 is effected just prior to the arrest of the auxiliary carriage by the arresting member 133 as the platen and auxiliary carriages travel together to the right. It follows therefore that when the auxiliary carriage is arrested by the member 133 the platen carriage may continue its movement to the right independently thereof. This independent movement of the platen carriage may continue under the control of the usual power actuated carriage return mechanism until an arrest thereof is effected in the usual manner. At such time the locking member 82 will have been returned with the platen carriage to a point where said locking member will reengage the latch 81 and at the next forward advance of the platen carriage in the direction of its feed the auxiliary carriage will be locked thereto in a predetermined relation to advance therewith as the items are being written.

It will be understood that when the auxiliary carriage is arrested in its return movement as hereinbefore described by the stop 93 said carriage, as shown in the present instance, also brings about an engagement between the contact lug 147 and the arresting device 133, and said auxiliary carriage is thereby automatically positioned with reference to the printing point so that the bill card will be in position to receive an entry at the beginning of the second line. Ordinarily the contact lug 147 does not pass to the right beyond engaging portion 137 of the arresting member 133. However, if for any reason this should occur the auxiliary carriage may be moved freely past the member 133 in the opposite direction, the lug 147 at such time engaging the cam edge 137ª of such member 133 and deflecting it down against the force of the spring 136 and out of the path of said lug.

In addition to the automatic horizontal relative shifting of the platen and auxiliary carriages described above, I have provided means for automatically effecting a bodily, vertical shifting of the paper table or work sheet holder 52 of the auxiliary carriage for line spacing the bill card. In the present instance such vertical shifting of the member 52 and the parts carried thereby takes place concurrently with and is brought about by the independent return travel of the auxiliary carriage. I shall now describe the means by which I effect this concurrent line spacing movement of the work sheet holder 52.

The work sheet holder 52 in the present instance is fitted for sliding vertical movement relative to the auxiliary carriage by the provision of a pair of guide plates 155 (Fig. 1) which are angular in cross section and are attached to the side plates 70 and 71 of said carriage by means of screws 156. This construction provides channels between the front ends of said side plates 70 and 71 and the overlapping guides 155 to receive the side edges of the paper table and enable the latter to slide vertically in said channels. A pair of rack bars 157 is attached to the rear side of the paper table 52 said rack bars cooperating with pinions 158 fixed on a shaft 160 which is rotatably mounted in the side plates 70 and 71. This construction aids in compelling the paper table to slide with a uniform movement at both ends and in allowing said paper table to slide up and down easily in the above described channels without skewing.

A roller 161 is carried on the rear side of the paper table 52 near the top thereof (Fig. 4) and bears against a cross bar or track 162 removably mounted as will presently appear in the side plates 34 of the supporting frame. This limits the extent of downward movement of said paper table. When the parts are in this position the roller 161 travels along the cross bar 162 during the independent travel of the auxiliary carriage. Fig. 5 shows the parts in their normal lower position with the roller 161 bearing on the cross bar 162. The weight of the paper table 52 and its associated paper guiding and clamping devices tends to return said table to and maintain it in this normal lower position. To compensate in part for the weight of the paper table and enable it to be lowered to the normal position without undue shock, I provide a so-called counterbalance spring 163 (Fig. 5). This spring may encircle the shaft 160 tending to resist its turning movement in a clockwise direction and thus through the associated rack bars and pinions 157 and 158 respectively retard or resist the downward urge of the paper table and the parts carried thereby under the force of gravity.

As shown in Fig. 4 there is provided another roller 164 mounted on a spindle 165 which in turn is fixed to a vertically adjustable rack bar or carrier 166. Said rack bar is mounted on the rear side of the paper table 52 for vertical sliding adjustment relative thereto and is guided in this sliding adjustment by an upper bracket 167 attached to a supporting arm 168, and by a pair of lower guides 170. The supporting arm 168 is or may be part of a special casting 171 which is attached to the rear side of the paper table 52 by any suitable means such as rivets 171ª. The rack bar 166 may be adjusted manually up and down by a finger wheel or adjusting device 172 removably fixed on the end of a stub shaft 173 (Figs. 1 and 5) which is journalled in an arm 174 (Fig. 4) provided on the supporting member 168 of the casting 171. A pinion 175 on the rearward end of the stub shaft 173 meshes with an idle pinion 176 which in turn meshes with the teeth 177 on one edge of the rack bar 166. Thus, a turning movement of the finger wheel 172 will adjust the rack bar 166 up or down relatively to the paper table 52, for purposes which will presently appear. The rack bar is held in any desired position to which it may be adjusted by a spring pressed detent 178 which engages with detent indentations 179 on the right-hand edge of the rack bar (Fig. 4), the detent and its spring being contained within a cylindrical housing 178ª which forms part of the casting 171.

When the rack bar 166 and its associated parts are in normal position, as shown in Fig. 4, and with the rack bar held in this position by the detent 178 the roller 164 rests on or engages the lower horizontal edge or dwell 180 of a platelike cam or trackway 181. The member 181 is removably secured to the rear side of the cross bar 162 by screws 181ª and comprises in addition to the lower horizontal edge 180, an inclined edge or trackway 182 and an upper horizontal edge or dwell 183, (Figs. 5 and 6) said upper horizontal edge 183 occupying in the present instance, a position four line spaces above the lower horizontal edge 180.

It is also to be noted from Fig. 4 that when the parts are in this normal position, the auxiliary carriage is in its initial position with the latch 81 engaging the stop or locking member 82. Thus, when said latch 81 is released from the stop 82 the auxiliary carriage will be returned to the right independently of the platen carriage under the urge of the spring drum 91 until said latch engages the stop or locking member 93. During this movement the roller 164 will ride along the lower horizontal edge 180, then up the inclined edge 182 and will come to rest on the upper horizontal edge 183. That is, the roller 164 is raised a distance of four line spaces, and the work sheet holder 52 to which it is connected and the bill card carried by said holder are likewise raised the same distance, such line spacing moving of the work sheet holder being incidental to the independent return movement of the auxiliary carriage. The next return movement of the platen carriage carries the auxiliary carriage back with it through the latch 81 engaging the member 93. Such movement continues until the auxiliary carriage is arrested by the coaction of the members 137, 147, as previously described. The platen carriage however, will continue its movement to the right carrying the cam 181 with it, thus allowing the roller 164 to ride down to the lower dwell 180 and thereby lowering the paper table 52 to its initial position ready to be again line spaced upward on the next return of the auxiliary carriage with a newly introduced bill card.

In order to vary the extent of line spacing that is automatically effected at each independent return movement of the auxiliary carriage, a mere turning adjustment of the finger wheel 172 the necessary extent is all that is required. For example, if a three line space movement instead of four is desired at each return of the auxiliary carriage, the finger wheel 172 will be turned in a clockwise direction (Fig. 4) to elevate the rack bar 166 relatively to the paper table 52 until the detent 178 engages in the next lower notch 179 in the rack bar. The effect of this is to set the roller 164 so that in cooperating with the cam 181 the work sheet holder 52 will be automatically elevated only three instead of four line spaces at each independent return movement of the auxiliary carriage. Elevating the roller 164 a further additional notch will result in the work sheet holder being shifted only two line spaces at each return of the auxiliary carriage, whereas the elevation of the roller 164 a further additional space by the finger wheel will result in a single line space movement only of the work holder being automatically effected. Therefore, the adjustment of the wheel 172 determines the extent of line spacing that will be automatically effected at each independent return of the auxiliary carriage. If it is desired to have the work sheet holder remain in its normal initial line space position, the roller 164 may be raised four or more spaces so that it will not engage the cam 181 at all when the auxiliary carriage is independently returned. The effect of this therefore is to render the automatically operating line spacing mechanism for the work sheet holder 52 inoperative.

Reverting again to Fig. 4 and the construction of the vertically shiftable rack 166, it will be observed that the paper table 52 may be moved for line spacing manually by turning the finger wheel 172 in a counter-clockwise direction, (or clockwise in Fig. 3) if a manual line spacing is desired. Turning the finger wheel 172 in a counter-clockwise direction (Fig. 4) will cause the gear 176 to travel up the rack, since said rack is held against downward movement by the roller 164. Each shifting of the detent from an indentation 179 to the one above it corresponds to one ordinary line space and will hold the paper table in its adjusted position.

Though I have shown a cam having a pitch of four line spaces between its lower and upper horizontal edges, it is to be understood that other cams may be used. Thus by changing the cam 181 practically any desired line spacing operation could be effected to meet the requirement of the work the machine is set up for.

While the cam 181 is detachable from the cross bar 162 and cams of different formation may be substituted one for another I prefer to provide means for readily detaching the cross bar 162 from the supporting frame so that a plurality of such cross bars provided with cams of different formation may be readily interchanged by the operator if desired. Such means for readily interchanging cross bars 162 will now be described.

Referring to Figs. 3 and 13 it will be observed that the left-hand end of the cam bar 162 is provided with a lug 162ª which is adapted to engage in an opening in the left-hand plate 34. The right-hand end of the bar fits into an open-ended slot in the right-hand side plate 34, which conforms in shape to the cross-section of the bar. Said right-hand end of the bar is provided with a lug 162ᵇ which extends beyond the surface of the plate 34 when the cam bar is in place and coacts with a spring pressed latch 162ᶜ pivoted to the right-hand plate 34, to hold the cam bar 162 in place. When it is desired to remove the cam bar the latch 162ᶜ may be turned in a clockwise direction about its pivot to disengage said latch from the lug 162ᵇ. Then the cam bar may be readily lifted and replaced with another for a different purpose as pointed out above.

It has been hereinbefore pointed out that the auxiliary carriage A is carried by the pivoted supporting frame which comprises in the main the side plates 34 and the cross bar or supporting rail 74. This supporting frame is pivoted to the main carriage at 184 and is adapted to swing forward about said pivots to a position away from the platen, being supported at the end of its forward swinging movement by means of a slotted link or member 185 pivoted at 186 to a bracket 185ª detachably fixed on the left-hand side plate of the main carriage frame. Such a forward swinging movement of the supporting frame facilitates in the insertion and adjustment of the record sheet L. When said supporting frame is in its operative position as shown in Fig. 1 the left-hand supporting plate 34 rests in a groove provided in the bracket 185ª. This firmly holds the supporting frame against endwise displacement on the main carriage frame. Said supporting frame is held in this position against swinging movement around its pivots 184 by a pair of latching members 187 one of which engages with a pin 188 on the bracket 185ª on the platen carriage frame and the other of which engages a corresponding pin 188ª (Fig. 5) at the other end of the platen carriage. Both of the latching members are mounted on a rock shaft 189 and may be released simultaneously by actuation of a finger piece 190 (Fig. 1), though they are resiliently held in locking position by a spring 191.

Having thus far described various features of one form of construction embodying my invention, I shall now describe in detail one type of work that the machine is particularly adapted for in the present instance. The example taken was explained briefly hereinbefore but having now a better understanding of the mechanism employed in the machine, a detailed description may be easily comprehended. This description will be followed by a discussion of the operation of the machine in connection with the use set forth.

As stated above the one example of the many uses that the machine is capable of which will be described herein concerns a form of billing and recording used by power companies. This particular type of work involves the use of a ledger or record sheet L called a "customer record" and individual bill sheets or cards B. As shown in Fig. 9, the customer record is a large sheet having a plurality of horizontal lines, each of which receives a series of entries relating to the power consumption and the cost thereof etc. for some particular customer. This sheet is also divided into a plurality of vertical columns for the reception of the various entries for each customer. These columns are headed with suitable descriptive captions which read respectively from left to right as follows: "Meter readings", "Present and previous"; "Consumption", "Total", "1st. rate", "2nd rate", "3rd rate", and "4th rate"; "Amount", "Gross" and "Net"; "Other charges"; "Appliance charges"; "Tax"; "Discount"; "Total"; and "Account number." Each customer record sheet contains the data for a group of customers according to a particular meter book from which certain of the data is obtained.

The bill sheet B used in this type of work comprises in the present instance, an ordinary postal card having two horizontal lines of ruled boxes thereon. As shown in Fig. 10 the upper line which does not extend the entire width of the card, contains six of these boxes which correspond to the first six columns of one horizontal line on the record sheet. These are captioned in a slightly different manner as follows: "Meter readings", "Present" and "Previous"; "k. w. hours consumed"; "Rate per k. w. hours", "8¢", "6¢" and "4¢". The second line on the card contains ruled boxes for the reception of the following eight items: "Rate per k. w. hour", "3¢"; "Amount of bill", "Gross" and "Net"; "Other charges"; "Appliance charges"; "U. S. Gov't 3% excise tax"; "Discount"; and "Total net am't". It will be observed that the last two items, namely "Discount" and "Total net am't", alone occupy the right-hand portion of the card which portion constitutes a stub or coupon that is to be detached if the payment is made by mail. In such a case the remaining larger portion may be kept by the customer for a record.

Referring to Fig. 14, it will be seen that the machine is provided with a group of vertical totalizers 195 which are mounted in a well known manner on the usual truck 196 carried at the front of the main carriage of the electrified Remington bookkeeping machine. There is one of these vertical totalizers for each of the fourteen vertical columns enumerated above and shown on the record sheet in Fig. 9, each vertical totalizer corresponding in width to its respective column. Only five vertical totalizers are shown in the fragmentary diagrammatic illustration of Fig. 14. The first of these takes the entries made in the "Present" "Meter reading" column, the second is for the "Previous" "Meter reading" column and so on. If for any reason it is not desired to take a total of the entries made in any particular vertical column on the record sheet L, a dummy vertical totalizer may be used instead of the regular vertical totalizer 195.

As is well known in machines of this type each time a vertical totalizer 195 approaches the computing zone, it picks up the usual cross truck 197 by means of a pick-up beam 198 to carry the left-hand cross totalizer 200 and the right-hand cross totalizer 201 over their respective master wheels as the associated vertical totalizer is passing through the computing zone. The usual state control or gear shift mechanism, by which the actuation of the master wheels for the cross totalizers is controlled, is in turn controlled by the usual cams 202 on the vertical totalizers which cooperate with cam followers 203 on the front of the actuator frame. These cams 202 may be of various types and by cooperating with the cam followers 203 they are able to set the actuating gears of either or both of the cross totalizers to either the add, subtract or disconnect position. All of the computing mechanism used herein is of the well known Wahl type as set forth in the Wahl Patent No. 1,270,471, and is power actuated in a manner described in my hereinbefore mentioned co-pending application filed January 24, 1931, and bearing Serial No. 510,941 (now Patent No. 2,063,737). Reference may be made to either the above mentioned patent or application for a description of any mechanism which these drawings do not show and which Remington bookkeeping machines include, or any mechanism which is particularly referred to and not fully illustrated herein.

Referring again to Figs. 9 and 10, it will be seen that a series of entries has been made across the top horizontal line of the record sheet, and the same entries appear in the two lines on the bill card. These entries are typical of a group that may have been obtained for some particular customer. I shall now explain how these various amounts are arrived at, and how they are entered into the vertical and cross totalizers and proved when a line like that shown is written.

It has been assumed that the "Present" "Meter reading" is "7557" and the "Previous" "Meter reading" is "7487". These two amounts are obtained from the meter reader's book, the number of which would appear at the top of the record sheet. The meter reader, of course, has previously made these entries in the book after a reading directly from a customer's meter. The "Present" "Meter reading" is entered into the first column on the record sheet and bill card and the vertical totalizer for said first column is provided with add cams for both cross totalizers so that after the entry has been made "7557" will appear in each cross totalizer. Next the amount "7487" is entered in the second column and subtracted in both cross totalizers, subtract cams being provided on the vertical totalizer for this column. With this amount subtracted, both totalizers will show "70" which is the entry for the third column. The vertical totalizer for this column is provided with a subtract cam for the left cross totalizer and disconnect for the right. Hence when "70" is entered into the third column this amount will be subtracted in the left cross totalizer to clear the same and no computation will be made in the right cross totalizer so said totalizer will still show "70". A clear signal may then be printed if desired. The next four vertical totalizers are provided with cams to set the actuating gears of the left-hand cross totalizer at disconnect and the right at subtract. These next four amounts should total "70" so that when they are consecutively entered and the "20" for column seven is printed the right-hand cross totalizer will be cleared and both cross totalizers will again show zero. The number of kilowatt hours for each of the first three rates is predetermined so that the "4th rate" column should contain the difference between the sum of the first three and the total kilowatt hours consumed. After the entering of the "20" for the "4th rate" column, a clear signal for the right cross totalizer may be printed if desired.

Next, the operator observes the "Amount of bill" from a rate chart for the particular number of kilowatt hours consumed, and enters the amounts, "Gross" and "Net", in the eighth and ninth columns respectively. The vertical totalizer for the "Gross" "Amount" column is provided with an add cam for the left cross totalizer and a disconnect cam for the right, and the vertical totalizer for the "Net" "Amount" column is provided with a disconnect cam for the left cross totalizer and an add cam for the right. Thus at the beginning of the tenth, or "Other charges" column the left-hand cross totalizer will show "350" and the right-hand cross totalizer "320", the "Gross" and "Net" amounts respectively. The "Gross" "Amount" is figured in the rate charts by multiplying each amount in the four rate columns by its respective rate of 8, 6, 4 and 3 cents, and adding the results. The "Net" "Amount" is equal to the "Gross" "Amount" minus the "Discount" which in the present instance, is allowed at the rate of 1¢ per kilowatt hour on the consumption used at the first two rates and thus for the example taken is 30¢. However, as mentioned above the "Gross" and "Net" amounts do not have to be figured by the operator but are taken from the rate chart.

Add cams for both cross totalizers are provided on the vertical totalizers for the tenth, eleventh, and twelfth columns, since the amounts of "Other charges", "Appliance charges" and "U. S. Gov't tax", if there be any, are to be added to both the "Gross" and "Net" amounts. Thus when the "Discount" is ready to be entered the right-hand cross totalizer will show "680" and the left "710". The vertical totalizer for this column has a subtract cam for the left cross totalizer and a disconnect cam for the right, so that after the "30" is entered both totalizers will show "680" which is the "Total net amount". Finally this "Total net amount" is entered on the record sheet and bill card and subtracted in both cross totalizers leaving them both clear. At this point, a clear signal for each totalizer may be printed if desired, and the totalizers are in readiness for another group of entries.

Having thus described in detail one example of the many uses that a bookkeeping machine embodying my invention is capable of, I shall now describe the operation of the machine for the use explained, by way of example.

In describing the operation of the machine it will be assumed that the platen carriage is in position for the starting of a line and that the auxiliary carriage A is in a position toward the left-hand end of the rail 74 with the latch 81 engaged in the notch 88 of the stop or locking member 82. With the carriage in this position, the operator may unlatch the supporting frame by moving the finger piece 190 forward to release the latches 187 from the pins 188 and 188ª. Then the supporting frame can be swung forwardly about its pivots 184 to its position away from the platen 21, and as determined by the slotted link 185, so that the record sheet L and carbon sheet C may be readily inserted, with the aid of the paper table T, from the rear of the platen into the machine.

Having inserted the record sheet and its superposed carbon sheet, the supporting frame is moved back to the position shown in Figs. 1 and 5. From Fig. 5 it will be observed that when the supporting frame is in this downward position the feed rollers 30 will engage the inserted carbon and record sheets, and said sheets may then be turned to the first line printing position.

Next, the operator inserts a bill card or sheet B into the chute formed by the paper table 52, side guides 51 and the plate 53. The card B is pushed downwardly, passing into the channel 42, until the bottom edge thereof is arrested by the stop 47, said stop having been adjusted so that when the bottom edge of the card B abuts it, said card will be in first printing line position.

When the record sheet, carbon sheet and bill card B have been inserted in this manner, and the platen or main carriage 20 is in its line starting position with the auxiliary carriage engaging the stop 82, the machine is in readiness for the first entry which will be the amount of the "Present" "Meter reading". This position of the main and auxiliary carriages and their associated work sheets may be assumed to be, in the present instance, the line starting position. Such position is shown diagrammatically in Fig. 6, wherein the dot and dash line P extends through the printing point, and is determined or regulated by inserting the work sheets and then adjusting the main carriage margin stop, the stop 82 and abutment 47 so that when said work sheets are inserted as described above the "Present" "Meter reading" may be manifolded from the bill card onto the record sheet with the entries appearing in the proper places on both work sheets.

Having both carriages and their record and bill sheets in line starting position the operator may start to insert or write the amount of the "Present" "Meter reading", such amount being printed in the proper place on the work sheets and entered into the totalizers as hereinbefore described. After the last digit of this amount has been entered the main carriage is automatically tabulated to the next columnar position by the automatic tabulator which will be described hereinafter. The auxiliary carriage is coupled with the main carriage by means of the latch 81 engaging the stop 82, and consequently it too is automatically moved with the main carriage to the second columnar position. The operator then enters the amount of the "Previous" "Meter reading" and after printing the last digit of such amount both carriages are again automatically tabulated to the third columnar position. The entering of the amounts and the automatic tabulation of the carriages continues in a like manner up to and including the sixth column, which contains the "3rd rate", "Consumption".

After the entering of the last digit in the sixth column the work sheets occupy the positions shown in Fig. 7. By referring to Figs. 9 and 10, it will also be observed that the sixth entry is the last entry of the first horizontal line on the bill card, the dotted showing of Fig. 10 illustrating the relative vertical relationship of the columns on the record sheet and bill card. The entry for the seventh column on the record sheet is to be made in said column and in the first space in the second horizontal line on the bill card. The main and auxiliary carriages then start again to move under the effect of the automatic tabulator as soon as this sixth entry has been completed. During the first letter space movement of the carriages under this automatic tabulating movement, the tripping member 104, which has been pre-set in this position, contacts the trip pawl 111 to effect, through the three-armed lever 95 and the angular levers 121, a raising of the latch 81, as hereinbefore described. Releasing of the latch 81 from the notch 88 of the stop 82 in this manner allows the auxiliary carriage to travel along the rail 74 to the right (Fig. 3) under the urge of the spring drum 91, such travel being relative to the main or platen carriage which is moving to the left in an automatic tabulating movement to bring the seventh column on the record sheet to the printing point.

As the auxiliary carriage is then moving to the right, the roller 164 rides up the inclined edge 182 of the cam 181 and comes to rest on the upper horizontal edge or dwell 183 thereby automatically line spacing the bill card B. This return movement of the auxiliary carriage is arrested when the latch 81 carried thereby reaches the abutment 94 of the stop or locking member 93. This relative return movement of the auxiliary carriage has caused the work sheets to move from the position shown in Fig. 7 to the position shown in full lines in Fig. 8. In Figs. 6, 7 and 8 it will be observed that a dot and dash line P extends vertically across all of said figures and passes through the printing point X in all of the views, and thus aids in depicting the movements of both carriages and both work sheets with respect to the printing point at different steps in the operation of the machine. It will also be observed that on the work sheet B in each figure there is one or more horizontal dot and dash lines, the lower one of which in Fig. 8 represents the printing line. Thus in Fig. 6 there is shown the starting position of the work sheets, and in Fig. 7 six entries have been made upon the bill card and the auxiliary carriage is about to be returned to the right as hereinbefore described. When the auxiliary carriage is thus shifted to the right, aside from shifting the sheet B so that entries will again be started at the left-hand edge thereof, said sheet has been line spaced by the vertical movement of the work sheet holder 52, said vertical movement of the work sheet holder having been effected through the roller 164 and cam 181. The aforementioned return movement of the auxiliary carriage A and vertical shifting of the work sheet holder 52 may take place within one letter space movement of the platen carriage. Therefore, in the present instance, when said platen carriage is automatically tabulated from the sixth to seventh column the shifting of the auxiliary carriage will be completed when the platen carriage comes to rest in the seventh columnar position and said auxiliary carriage will be in position to have the seventh entry made in the first box of the second horizontal line on the work sheet B. It is to be understood that this shifting of the auxiliary carriage and its resulting collation of the work sheets is entirely automatic and practically instantaneous in its operation, so that the operator does not have her attention diverted and is not interrupted in any manner while making a series of entries.

With the auxiliary carriage in its returned position as shown in Fig. 8, the seventh entry may be made by the operator, after which the main carriage will again be automatically tabulated for the entry of the "Gross" "Amount". This is made in the second box on the second line of the bill card B and manifolded into the eighth column on the record sheet L. The "Gross" "Amount" is entered, the main carriage automatically tabulated and the same operations continued until the bill card is completed and the "Total net amount" has been printed. At this point the work sheets will occupy the positions shown in dotted lines in Fig. 8.

Since at this time the auxiliary carriage is coupled with the platen carriage by means of the engagement of the latch 81 with the final stop 93, it will be obvious that if the main carriage is automatically tabulated or otherwise moved further to the left, said auxiliary carriage and the bill card B will be carried beyond the printing point. Hence entries or notations of any kind may at such time be made upon the record sheet in the right-hand portion thereof beyond the "Total net amount" column, and said entries or notations will not be printed on the bill card B. Thus, if it is desired to enter the number of the customer's account in the "Account number" column the main carriage may be automatically tabulated to this column and the operator may make such entry, as is depicted in Fig. 9, the number there shown being arbitrary.

In the present instance, it is assumed that the account number is the only entry to be made in this portion of the sheet and that each account number is a four digit number. Then an automatic power actuated carriage return mechanism of any suitable type may be employed and set to return the carriage and line space the platen as soon as the last digit of the account number is printed. In the event that other entries are to be made in other columns near the right-hand side of the work sheet L then the automatic carriage return may be set accordingly or the usual return key for the power actuated carriage return mechanism may be employed to return the carriage. Assuming that such automatically operating carriage return mechanism is used in combination with my invention, it will be apparent that after the last digit of the account number is printed, the main carriage will start to move to the right, carrying with it the auxiliary carriage. This joint return movement of the two carriages will continue until the lug 147 of the unlatching device 138 engages the hook 137 of the holding member 133. At this time, as explained above, the auxiliary carriage is arrested in its line starting position with respect to the printing center, and the main carriage continues to move to the right relative to the auxiliary carriage until it too is in line starting position. When the main carriage reaches this line starting position, the latch 81 will engage the stop 82 to re-couple the auxiliary carriage with said main carriage and the parts will again occupy the relationship shown in Fig. 6. The operator then removes the completed bill card and inserts another, and the machine is in readiness for another group of entries and the automatic collation of the work sheets during the course of making said entries.

In order that the continuity of the foregoing description might not be destroyed and the explanation of the important features of my present invention obscured, I have delayed until now the description of the automatic tabulator used in combination with my present invention, except as it has been hereinbefore generally referred to. This mechanism, which may be of any suitable type, is all fully disclosed in the co-pending application of Dodge and Philbin above referred to, but a summary of the general construction and operation will be included herein so that I shall have presented a full and complete showing of my invention as it is included in combination with an automatic tabulator.

As hereinbefore mentioned the Remington electrified bookkeeping machine is power actuated under the control of an electric motor mounted at the rear of said machine. This motor drives a series of shafts which in turn effect the operation of the type bars, computing mechanism, carriage return, tabulator mechanism and the like.

Referring to Fig. 11, it will be seen that a power actuated driving shaft 205 which is supported in bearings in the base frame section and is rotated by the electric motor, has a cam 206 loosely mounted thereon near the left end of said shaft. This cam is adapted to be locked to the continuously rotating shaft by means of a pawl 207 pivoted to said cam and cooperating with a toothed locking wheel 208 fixed on the shaft 205 to turn therewith. The pawl 207, which is urged in a locking direction by a spring and push rod 209, is normally maintained disconnected from the locking wheel by a trip arm 210 which engages a projection 211 on the pawl 207. Means are also provided comprising a cam 212 and a cooperating angular detent lever 213 which prevent a return movement of the cam 206 under the reaction of its spring actuated pawl 207.

A second trip arm 214 is formed integral with the arm 210 so that the connected arms 210, 214 constitute a bellcrank lever pivoted at 215 and spring pressed to normal Fig. 11 position by a contractile spring 216. It will be understood that when the double trip 210, 214 is turned or moved in a clockwise direction the cam 206 will be connected to turn with the driving shaft 205 for approximately one quarter of a revolution, when the cam is disengaged from the shaft by the interposed trip arm 214 coacting with the pawl 207 and disengaging it from the locking wheel 208. This movement of the cam is effective to project a tabulator stop and release the carriage from the control of its escapement mechanism, as will hereinafter appear.

When the cam 206 is given such a movement, a roller 217 carried by a pivoted upright arm 218 and coacting with the cam 212 imparts a rearward movement to said arm. Such movement of the upright arm 218 effects a clockwise partial rotation of a tabulator stop actuating lever 219 through a bifurcated link 220, arm 221, and actuating slide 222. The lever 219 is or may be one of a series of such levers usually employed, and is pivoted intermediate its ends at 223 in the tabulator frame 224 and is returned to its normal position by the usual spring 225 associated therewith. The upper end of this lever is received in a notch 226 in a tabulator stop 227 mounted in the usual manner to slide fore and aft of the machine in the tabulator frame. When the tabulator stop 227 is projected to effective position by action of the cam 206, it is interjected into the path of the next of a series of column stops 228. These column stops 228 are adjusted to different positions along a column stop bar 229 fixed on the platen carriage 20 in the usual manner to determine the columnar positions of arrest of said carriage.

I will now describe the means by which the power driven cam 206 is controlled and by which the carriage is released from control of its escapement mechanism.

Secured to and beneath the column stop bar is a channel bar 230 that preferably extends throughout the length of the column stop bar. This channel bar is tapped transversely at letter space intervals substantially throughout the length thereof for attachment at different points in its length of one or more controlling cams or contact blocks or devices 231. As shown in Fig. 12 each block 231 has a projection 232 on the upper side thereof which is adapted to be seated in a groove on the under side of the bar 230, when the block is secured thereto in any desired letter space position by means of headed screws 233 passing through openings in the block and engaging in tapped openings in the bar 230. The advancing or left-hand end of each block has a transverse bevel or cam face 234 thereon that terminates at its low point in a dwell 235 formed by the entire rear side of the block, for purposes which will hereinafter appear.

The function of these cam blocks 231 will best be understood by a consideration of Fig. 12 from which it will be seen that a trip lever 236 has a contact end 237 that normally extends into the path of the blocks 231. When the cam face 234 on the front end of one of the blocks engages the end 237 of the lever, the latter will be shifted bodily towards the rear of the machine since said lever is pivoted intermediate its ends at 238 to a swingable frame 239 pivotally mounted as at 240 in a bracket 241, which is screwed to the top plate 23 of the machine.

It will be understood that the action of a cam 234 on the lever 236 turns the lever and the frame 239 on which it is mounted toward the rear of the machine around the pivots 240. The result of this is to effect a downward movement of a rearwardly extending arm 242 fixed on the frame 239, and having a contact shoe 243. Said contact shoe overlies the upper free end of a downwardly extending two part rod 244 which, as shown in Fig. 11, coacts with one arm 245 of a releasing member pivotally supported on a rod 246. This releasing member has a forwardly extending arm 247 that extends beneath an arm 248 of the trip 210, 214, and hence it follows that when the rod 244 is depressed as described, the trip 210, 214 will be turned to release the pawl 211 from the trip 210. Such a release of the pawl enables the cam 206 to turn to project the associated tabulator stop 227. The arm 214 is also interposed in the path of the pawl 211 so that after a quarter turn, said pawl will be automatically disengaged and the projected tabulator stop will remain in its projected position.

The length of time that the projected stop is held in such position is determined by the length of the dwell 235 on the controlling cam 231 by which the automatic actuation of the tabulator stop is brought about. Thus, if a relatively long tabulating jump of the carriage is to be provided, then a proportionately long cam block 231 is provided, or if a short jump is desired a relatively short cam is provided.

When a controlling cam block 231 has passed the control lever 236, said lever, the frame 239 which carries it, and the parts controlled thereby are returned by their suitable returning springs to their normal positions shown in Fig. 11.

It will be understood of course, that the set-up of the column stops 228 will accord with the set-up of the cams 231. In the present instance, with the record sheet having the set-up shown in Fig. 9, there will be a column stop 228 for each first digit position of each column in which entries are to be made, and a cam 231 for each column, which starts to operate after the last digit of each entry and extends in length to the next column stop.

Each time the tabulator stop is projected it is necessary to release the carriage from the control of its escapement mechanism and to attain this end there is provided a universal bar 250 (Fig. 11) which is engaged by the actuating lever 219 each time it is turned. This universal bar actuates, through a series of links and connections 251, 252, 253 and 254 etc., a carriage releasing device 255. The construction is such that each time the tabulator stop 227 is projected, the releasing device 255 will raise the feed rack 256 from the feed pinion 257. This frees the platen carriage from control of its escapement mechanism and under the operation of the automatic tabulator mechanism the platen carriage will be maintained free until the active control cam block 231 passes the control lever 236 and said carriage is arrested by the coacting tabulator stops. After this the cam 206 completes its cycle and the parts are restored to Fig. 11 position, the feed rack 256 reengaging the feed pinion 257.

I have hereinbefore pointed out that one of the important factors in connection with the present invention is that an ordinary machine, such for example as the Remington electrified bookkeeping machine, may be equipped with the devices of my invention without modifying, or materially modifying the existing structural features of said machine, said devices being applied to the machine in the nature of attachments. In this regard it is to be noted that by removing the screws at the pivot points 184 and the screw 186 the auxiliary carriage supporting frame and the mechanism carried thereby including the auxiliary carriage may be detached, and by removing the supporting bracket or extension 112 and the rock shaft 100 the entire tripping mechanism may be dismounted. Then the additional paper deflectors 43, 44 may be separated from the main carriage by removing the screws from the supporting brackets 45. The removal of these parts leaves the remaining construction practically as an ordinary Remington electrified bookkeeping machine.

From the foregoing description it will be apparent that by my present invention I have provided in a typewriting or like machine:—

(a) Comparatively simple and yet highly efficient and improved means whereby a comparatively wide record sheet and a comparatively small or narrow customer's bill card or sheet may be printed simultaneously, the entries on the record sheet appearing in one horizontal line while the same entries are made on the bill card in a plurality of lines;

(b) Means for automatically and properly collating superposed work sheets, whereby after the initial insertion of said sheets into the machine, the collating movements thereof are entirely automatic;

(c) A work sheet holder constructed and arranged to travel with and independently of the main carriage, and in which said work sheet holder receives a bodily line spacing movement in a direction transverse to its traveling movement;

(d) Means for automatically controlling a work sheet holder of the character referred to in its traveling and line spacing movements;

(e) Adjustable means by which varying extents of line spacing may be readily effected; and (f) Adjustable means whereby the above mentioned work sheet holder may be automatically returned to the desired first writing line position after it has completed its line spacing operations.

Various changes may be made in the construction, and certain features thereof may be employed without others, without departing from my invention as it is defined in the accompanying claims.

What I claim as new and desire to secure by Letters Patent is:

1. The combination of a main carriage, a platen carried thereby, an auxiliary work-sheet-carrying carriage mounted to travel therewith and for independent traveling movement thereon, automatically operating means for effecting such independent movement of the auxiliary work-sheet-carrying carriage, automatically operating means for effecting a line spacing of the work sheet carried by said auxiliary carriage at each of said independent movements thereof, and means settable to vary the extent of line spacing that is provided at each automatic line spacing of said work sheet.

2. The combination of a main carriage, an auxiliary work-sheet-carrying carriage mounted to travel therewith and to receive an independent travel, and a work sheet holder carried by said last mentioned carriage and mounted therein to receive a bodily independent line spacing movement in a direction transverse to that of the travel of the main and auxiliary carriages.

3. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, and automatically operating means for bringing about a line spacing movement of said work sheet holder during the independent movement of said auxiliary carriage.

4. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, automatically operating means for effecting such independent travel of the auxiliary carriage, and automatically operating means for effecting such line spacing movement of said work sheet holder.

5. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, and means for effecting such line spacing movement of the work sheet holder comprising a cam intermediate the main carriage and said holder and effective on the latter during the independent movement of the auxiliary carriage.

6. The combination of a main carriage, an auxiliary work-sheet-carrying carriage mounted to travel therewith and to receive an independent travel, a work sheet holder in the nature of a paper table with work sheet engaging means carried thereby, said holder being carried by the auxiliary carriage and mounted therein to receive a bodily independent line spacing movement in a direction transverse to that of the travel of the main and auxiliary carriages, and means for effecting such line spacing movement of the work sheet holder.

7. The combination of a main carriage, an auxiliary work-sheet-carrying carriage mounted to travel therewith and to receive an independent return travel, a work sheet holder in the nature of a paper table with work sheet engaging means carried thereby, said holder being carried by the auxiliary carriage and mounted therein to receive a bodily independent line spacing movement in a direction transverse to that of the travel of the main and auxiliary carriages, and automatically operating means for effecting such line spacing of the work sheet holder during said independent return movement of the auxiliary carriage.

8. The combination of a main carriage, an auxiliary work-sheet-carrying carriage mounted to travel therewith and to receive an independent travel, a work sheet holder in the nature of a paper table with work sheet engaging means carried thereby, said holder being carried by the auxiliary carriage and mounted therein to receive a bodily independent line spacing movement in a direction transverse to that of the travel of the main and auxiliary carriages, and automatically operating means for effecting such line spacing of the work sheet holder during said independent movement of the auxiliary carriage, said last mentioned means comprising a cam on the main carriage, and means cooperative therewith for lifting the work sheet holder for line spacing.

9. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, and automatically operating means for effecting an upward line spacing movement of said work sheet holder during said independent travel of the auxiliary carriage in one direction and for lowering said work sheet holder to initial position during travel of the main carriage independently of the auxiliary carriage in the opposite direction.

10. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, and means for effecting such line spacing of the work sheet holder comprising a cam member and a contact member, one carried by the main carriage and the other by the work sheet holder, and adjusting means for adjusting one of said members relatively to the part by which it is carried.

11. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, and automatically operating means for effecting such line spacing of the work sheet holder comprising a cam member and a contact member, one carried by the main carriage and the other by the work sheet holder, said cam and contact members being brought into cooperative engagement by a relative travel between the auxiliary and main carriages, and adjusting means for adjusting one of said members relatively to the part by which it is carried.

12. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of travel of the main and auxiliary carriages, and means for effecting such line spacing of the work sheet holder comprising a cam carried by the main carriage, a cooperative contact device carried by the work sheet holder, and means for effecting an adjustment of said contact device relatively to said holder, whereby the line spacing may be varied.

13. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, and means for effecting such line spacing of the work sheet holder comprising a cam carried by the main carriage, a cooperative contact device, a bar carried by and adjustable on said work sheet holder and by which said contact device is carried, and manually controlled means for adjusting said bar and for retaining it in its adjusted position on said work sheet holder.

14. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of travel of the main and auxiliary carriages, and means for effecting such line spacing of the work sheet holder comprising a cam carried by the main carriage, a cooperative contact device, a rack bar carried by and adjustable on said work sheet holder and by which said contact device is carried, a manually controlled pinion that meshes with said rack bar for adjusting it, and a detent for holding the rack bar against accidental displacement from its adjusted position.

15. The combination of a main carriage, an auxiliary work-sheet-carrying carriage mounted to travel therewith and to receive an independent travel, a work sheet holder in the nature of a paper table carried by said last mentioned carriage and mounted therein to receive a bodily independent vertical line spacing movement, work sheet clamping means carried by said work holder, and automatically operating means for effecting a line spacing of said work holder and for returning it to its first writing line position.

16. The combination of a main platen supporting carriage, a supporting member on the main carriage, an auxiliary carriage mounted on said supporting member to travel with said main carriage and to receive an independent travel along said supporting member, locking means for locking the auxiliary and main carriages to travel together, and automatically operating means for controlling said locking means to afford a relative movement between the auxiliary carriage and the main carriage, whereby two superposed sheets may be simultaneously written on and the written items are distributed across one sheet in a horizontal line whereas said items are distributed vertically on the other sheet.

17. The combination of a main platen supporting carriage, a supporting member on the main carriage, an auxiliary carriage mounted on said supporting member to travel with said main carriage and to receive an independent travel along said supporting member, locking means for locking the auxiliary and main carriages to travel together, and automatically operating means for controlling said locking means to afford a relative movement between the auxiliary carriage and the main carriage, the construction and arrangement of the parts being such that said locking means will be released at a given point in the advance of both of said carriages together in order to afford an independent return movement of the auxiliary carriage and will be automatically released during the return movement of both carriages together in order to afford a further independent return movement of the main carriage.

18. The combination of a main platen supporting carriage, a supporting member on the main carriage, an auxiliary carriage mounted on said supporting member to travel with said main carriage and to receive an independent travel along said supporting member, locking means for locking the auxiliary and main carriages to travel together, said locking means including relatively adjustable members for affording varying extents of said independent travel of the auxiliary carriage, and automatically operating means for controlling said locking means to afford a relative movement between the auxiliary carriage and the main carriage, whereby two superposed sheets may be simultaneously written on and the written items are distributed across one sheet in a horizontal line whereas said items are distributed vertically on the other sheet.

19. The combination of a main platen supporting carriage, a supporting member on the main carriage, an auxiliary carriage mounted on said supporting member to travel with said main carriage and to receive an independent travel along said supporting member, locking means for locking the auxiliary and main carriages to travel together, said locking means including stopping means for arresting said independent movement of the auxiliary carriage in proper position with reference to the printing point, and automatically operating means for controlling said locking means to afford a relative movement between the main carriage and the auxiliary carriage, whereby two superposed sheets may be simultaneously written on and the written items are distributed across one sheet in a horizontal line whereas said items are distributed vertically on the other sheet.

20. The combination of a main platen supporting carriage, a supporting member on the main carriage, an auxiliary carriage mounted on said supporting member to travel with said main carriage and to receive an independent return travel along said supporting member, power means for impelling the independent return movement of the auxiliary carriage, locking means for locking the auxiliary and main carriages to travel together, and automatically operating means for controlling said locking means to afford an independent return movement of the auxiliary carriage, whereby two superposed sheets may be simultaneously written on and the written items are distributed across one sheet in a horizontal line whereas said items are distributed vertically on the other sheet.

21. The combination of a main platen supporting carriage, an auxiliary carriage mounted to travel with the main carriage and also to afford relative traveling movements between said carriages, and automatically operating means for bringing about such movements comprising means for locking said carriages to travel together, tripping means operable for automatically releasing said locking means during the travel of the carriages together in one direction only, and a second tripping means operable to release said locking means only during the travel of the carriages together in the opposite direction.

22. The combination of a main platen supporting carriage, an auxiliary carriage mounted to travel with the main carriage and also to afford relative traveling movements between said carriages, and automatically operating means for bringing about such movements comprising means for locking said carriages to travel together, tripping means operable for automatically releasing said locking means during the travel of the carriages together in one direction only, said tripping means including a contact carried by the main frame of the machine and a cooperating adjustable contact carried by the main carriage, and a second tripping means operable to release said locking means only during the travel of the carriages together in the opposite direction, said last mentioned tripping means comprising an adjustable contact carried by the main frame of the machine and a cooperative contact carried by the auxiliary carriage.

23. The combination of a main carriage, an auxiliary work-sheet-carrying carriage mounted to travel therewith and to receive an independent travel, a work sheet holder carried by said last mentioned carriage and mounted therein to receive a bodily independent line spacing movement in a direction transverse to that of the travel of the main and auxiliary carriages, automatically operating means for effecting an upward line spacing movement of said work sheet holder during said independent travel of the auxiliary carriage in one direction and for lowering said work sheet holder to initial position during travel of the main carriage independently of the auxiliary carriage in the opposite direction, and automatically operating means for bringing about such independent travel of the auxiliary carriage.

24. The combination of a main carriage, an auxiliary work-sheet-carrying carriage mounted to travel therewith and to receive an independent travel, and a work sheet holder in the nature of a paper table with work sheet engaging means carried thereby, said holder being carried by the auxiliary carriage and mounted therein to receive a bodily independent line spacing movement in a direction transverse to that of the travel of the main and auxiliary carriages, and a cam carried by the main carriage and cooperative with said paper table to bring about said independent line spacing movement thereof.

25. In a typewriting machine, the combination with a letter-feeding carriage, of a truck guided for movement in letter-feeding and return directions, means coupling said carriage and truck for joint movement, said means being releasable for effecting displacement of the truck relatively to the carriage in said directions, a paper holder traveling with said truck and guided for shifting movement transversely of said directions, and means whereby the relative displacement of said carriage and truck causes a transverse movement of said paper holder.

26. In a typewriting machine, the combination with a letter-feeding carriage, of a truck guided for movement in letter-feeding and return directions, means coupling said carriage and truck for joint movement, said means being releasable for effecting displacement of the truck relatively to the carriage in said directions, a paper holder traveling with said truck and guided for shifting movement transversely of said directions, and means whereby the relative displacement of said carriage and truck causes such transverse movement of said paper holder, said last mentioned means including a guide on the carriage and on which said paper holder bears and which is inclined to the direction of said displacement.

27. An apparatus for typing amounts in a single vertical column on a bill-sheet and at the same time manifolding said amounts in a single horizontal line across a record-sheet, including a record-sheet carriage movable in letter-feeding direction, and a holder or truck for the bill-sheet movable jointly with said carriage for letter-feeding, said carriage including a guide on which the truck may be shifted for collating the vertical bill-sheet column with different columns spaced across the record-sheet, said guide being inclined to the direction in which the truck is shifted, so that the truck also has a movement transverse of the column-collating shift, said transverse movement being effective to line space the bill-sheet incidentally to said shift.

28. An apparatus for typing amounts in one or more vertical columns on a bill-sheet and at the same time manifolding said amounts in a single horizontal line across a record-sheet, including a record-sheet carriage movable in letter-feeding direction, a holder for the bill-sheet movable jointly with said carriage for letter-feeding, said carriage including a guide on which the holder may be shifted for collating the vertical bill-sheet column or columns with different columns spaced across the record-sheet, said guide being inclined to the direction in which the holder is shifted, so that the holder also has a movement transverse of the column-collating shift, said transverse movement being effective to line space the bill-sheet incidentally to said shift, a motor for shifting said holder on said guide, and means acting in conjunction with said motor for positioning said holder relatively to the record-sheet columns.

29. An apparatus for typing amounts in one or more vertical columns on a bill-sheet and at the same time manifolding said amounts in a single horizontal line across a record-sheet, including a record-sheet carriage movable in letter-feeding direction, a holder for the bill-sheet movable jointly with said carriage for letter-feeding, said carriage including a guide on which the holder may be shifted for collating the vertical bill-sheet column or columns with different columns spaced across the record-sheet, said guide being inclined to the direction in which the holder is shifted, so that the holder also has a movement transverse of the column-collating shift, said transverse movement being effective to line space the bill-sheet incidentally to said shift, a motor for shifting said holder on said guide, and means acting in conjunction with said motor for positioning said holder relatively to the record-sheet columns.

30. In a typewriting machine having numeral type keys and a carriage traveling under the control of said keys, the combination of a truck mounted to travel with and relatively to said carriage, and a work sheet holder carried thereby for presenting a work sheet at the printing point so that a plurality of amounts that are typed in vertical arrangement on said sheet are manifolded in a single line across an underlying work sheet and so that as said carriage advances, the work sheet on the truck may be correspondingly returned to keep its proper columnar position at the printing point, and a cam having a face inclined to the direction of the travel of said truck and which coacts with said work sheet holder, so that the latter also has a transverse movement effective to line space the work sheet carried thereby incidentally to said shift of the truck.

31. In a typewriting machine having a printing field, the combination with a paper carriage for carrying a record-sheet across which are to be typed a plurality of item columns, said carriage movable in column tabulating direction past said printing field, of a trackway on said carriage extending in the direction of column spacing, a truck having a paper table supported by and shiftable along said trackway, and means cooperative with said table to hold another work sheet superposed on the record-sheet at the printing field, said means including a device for holding said other sheet against said table, said trackway and said table being disposed so as to clear the printing field, the shift of said paper table on said trackway being operative to collate said other sheet with any record-sheet column, said trackway being inclined to said column tabulating direction of the paper carriage so that incidentally to said shift of the paper table along said trackway, said other sheet is also line spaced.

32. In a front strike typewriting machine, the combination with a traveling carriage having a platen at the printing line, of a trackway on said carriage inclined to the printing line, a truck in the form of a paper table supported by and shiftable along said trackway, means cooperating with said table to hold a work sheet against the platen at the printing line, a second trackway on said traveling carriage extending substantially parallel to the printing line, an auxiliary carriage supported by and shiftable along said second trackway, means connecting said paper table and auxiliary carriage for joint shifting movement relative to said traveling carriage, said connecting means being arranged to permit the transverse movement of the paper table which accompanies said joint movement by reason of the inclination of the paper table trackway, and means carried by said traveling carriage for holding said auxiliary carriage and hence said paper table in predetermined positions to which they may be jointly shifted along their respective trackways, each position predetermining a corresponding line space on said sheet by reason of the inclination of the paper table trackway.

33. In a front strike typewriting machine, the combination with a traveling carriage having a platen at the printing line, of a trackway on said carriage inclined to the printing line, a paper table supported by and shiftable along said trackway, means cooperating with said table to hold a work sheet against the platen at the printing line, a second trackway on said traveling carriage extending substantially parallel to the printing line, an auxiliary carriage supported by and shiftable along said second trackway, means connecting said paper table and auxiliary carriage for joint shifting movement relative to said traveling carriage, said connecting means being arranged to permit the transverse movement of the paper table effected by the inclination of the paper table trackway, and means operative to hold said auxiliary carriage and hence said paper table in predetermined positions to which they may be jointly shifted along their respective trackways, and means operative to jump said auxiliary carriage to the right relatively to said platen carriage.

34. In a typewriting machine, the combination of numeral keys, a carriage traveling under control of said keys, a work sheet holder mounted to travel with and independently of said carriage and also to receive a bodily line spacing movement in a direction transverse to such direction of travel in order to present a work sheet carried by said holder at the printing point so that a plurality of amounts that are typed in vertical arrangement on said work sheet may be manifolded in a single horizontal line across an underlying work sheet and so that as said carriage advances, the work sheet on the holder may be correspondingly returned to bring it to proper columnar position at the printing point, and a cam having a face inclined to the direction of travel of said holder and carriage and which coacts with the work sheet holder to effect said transverse line spacing movement thereof.

35. In a typewriting machine, the combination of numeral keys, a carriage traveling under control of said keys, a work sheet holder mounted to travel with and independently of said carriage and also to receive a bodily line spacing movement in a direction transverse to such direction of travel in order to present a work sheet carried by said holder at the printing point and so that a plurality of amounts that are typed in vertical arrangement on said work sheet may be manifolded in a single horizontal line across an underlying work sheet and so that as said carriage advances the work sheet on the holder may be correspondingly returned to bring it in proper columnar position at the printing point, a cam having a face inclined to the direction of travel of said holder and carriage and which coacts with the work sheet holder to effect said transverse line spacing movement thereof, and automatically operating means for returning said work sheet holder when it reaches a given position in its advance with the carriage.

36. In a typewriting machine, the combination with a platen carriage, of a work-sheet-carrying auxiliary carriage, means for coupling the latter with said platen carriage for traveling movement therewith, and automatically operating means for releasing said coupling and shifting said auxiliary carriage by a traveling movement independently of said platen carriage, whereby two superposed sheets may be simultaneously written on and the written items are distributed across one sheet in a horizontal line whereas said items are distributed vertically on the other sheet.

37. In a typewriting machine, the combination with a platen carriage, of a work-sheet-carrying auxiliary carriage, means for coupling the latter with said platen carriage for movement therewith, automatically operating means controlled by the movement of the platen carriage for releasing said coupling and shifting said auxiliary carriage horizontally when said platen carriage reaches a predetermined point in its travel.

38. In a typewriting machine, the combination with a platen carriage of an auxiliary carriage, a work sheet holder carried by said auxiliary carriage and having a bodily line spacing movement thereon, means for coupling said auxiliary carriage with said platen carriage for traveling movement therewith, and automatically operating means for releasing said coupling and effecting a travel of said auxiliary carriage independently of the platen carriage when said platen carriage reaches a predetermined point in its travel and for effecting a line spacing movement of the work sheet holder during such independent travel of the auxiliary carriage.

39. In a typewriting machine, the combination with a platen carriage, of a work-sheet-carrying auxiliary carriage, means including a latch for connecting the latter to said platen carriage for traveling movement therewith, and platen carriage operated means for automatically tripping said latch when said platen carriage reaches a predetermined point, whereby a relative movement between said carriages may be effected.

40. In a typewriting machine, the combination with a platen carriage, of a work-sheet-carrying auxiliary carriage, means for coupling the latter with said platen carriage for traveling movement therewith, automatically operated means for releasing said coupling and effecting an independent travel of said auxiliary carriage when the platen carriage reaches a predetermined point in its travel, and means for varying the extent of said independent traveling movement of the auxiliary carriage, whereby two superposed sheets may be simultaneously written on and the written items are distributed across one sheet in a horizontal line whereas said items are distributed vertically on the other sheet.

41. In a typewriting machine, the combination with a platen carriage, of an auxiliary carriage having a work-sheet-carrying member shiftable vertically for line spacing, said auxiliary carriage being mounted for traveling movement with and independently of the platen carriage, means for coupling said carriages for joint traveling movement, and automatically operated means for releasing said coupling means during the joint movement of said carriages to bring about a relative traveling movement between said carriages and to effect a line spacing movement of said shiftable work-sheet-carrying member.

42. The combination of a main carriage, an auxiliary work-sheet-carrying carriage mounted to travel with and independently of said main carriage, automatically operating tabulating means for effecting a tabulating movement of said main and auxiliary carriages together as a single unit, and automatically operating means for effecting an independent travel of said auxiliary carriage.

43. The combination of a main carriage, an auxiliary work-sheet-carrying carriage mounted to travel with and independently of said main carriage, automatically operating tabulating means for effecting a tabulating movement of said main and auxiliary carriages together as a single unit in the direction of the feed of the main carriage, and automatically operating means for effecting an independent return travel of said auxiliary carriage in an opposite direction from that of the feed of the main carriage.

44. The combination of a main carriage, a platen carried thereby, means cooperative with said platen for supporting a work sheet thereon, automatically operating tabulating mechanism for said main carriage, an auxiliary work-sheet-carrying carriage mounted to travel with and independently of said main carriage, and means for returning said auxiliary carriage independently of said main carriage, whereby the work sheets on the two carriages may be collated.

45. The combination of a main carriage, a platen carried thereby, means cooperative with said platen for supporting a work sheet thereon, automatically operating tabulating mechanism for said main carriage, an auxiliary work-sheet-carrying carriage mounted to travel with and independently of said main carriage, and automatically operating means for returning said auxiliary carriage independently of said main carriage, and to a predetermined position relatively thereto, whereby the work sheets on the two carriages may be automatically collated.

46. In a machine for automatically collating a plurality of work sheets, the combination of a main work-sheet-carrying carriage, an auxiliary work-sheet-carrying carriage, and automatically operating means for causing said carriages to travel together and for effecting a relative traveling movement between them, whereby the work sheets carried by the two carriages may be collated.

47. In a machine for automatically collating a plurality of work sheets, the combination of a main work-sheet-carrying carriage, an auxiliary work-sheet-carrying carriage, automatically operating means for causing said carriages to travel together and for effecting a relative traveling movement between them, and automatically operating means for line spacing the work sheet carried by said auxiliary carriage.

48. In a machine for automatically collating a plurality of work sheets, the combination of a main work-sheet-carrying carriage, an auxiliary work-sheet-carrying carriage, and automatically operating means for causing said carriages to travel together a given distance and for then effecting a relative traveling movement between them for a given distance, and adjustable means for predetermining the distance the carriages shall travel together and for predetermining the distance the carriages shall travel relatively one to the other, whereby the work sheets carried by the two carriages may be collated.

49. In a machine for automatically collating a plurality of work sheets, the combination of a main work-sheet-carrying carriage, an auxiliary work-sheet-carrying carriage, automatically operating means for causing said carriages to travel together a given distance and for then effecting a relative traveling movement between them for a given distance, adjustable means for predetermining the distance the carriages shall travel together and for predetermining the distance the carriages shall travel relatively one to the other, and automatically operating means for line spacing the work sheet carried by said auxiliary work sheet, whereby the work sheets carried by the two carriages may be collated.

50. The combination of a main work-sheet-carrying carriage, an auxiliary carriage, a work sheet holder in the nature of a paper table carried by said auxiliary carriage and shiftable for line spacing in a direction transverse to the direction of travel of said auxiliary carriage, automatically operating tabulating mechanism for said main carriage, and automatically operating means for connecting said carriages to travel together a given distance and for then causing an independent travel of the auxiliary carriage relatively to the main carriage.

51. The combination of a main work-sheet-carrying carriage, an auxiliary carriage, a work sheet holder in the nature of a paper table carried by said auxiliary carriage and shiftable for line spacing in a direction transverse to the direction of travel of said auxiliary carriage, automatically operating tabulating mechanism for said main carriage, automatically operating means for connecting said carriages to travel together a given distance and for then causing an independent travel of the auxiliary carriage relatively to the main carriage, and automatically operating means for effecting a line spacing movement of said work sheet holder during the independent travel of said auxiliary carriage.

52. In a machine of the character described, the combination of means for printing items on one work sheet and for simultaneously making a manifold copy of such items on an underlying work sheet, automatically operating means for advancing both work sheets together in a letter-feed direction, automatically operating means for returning the outermost work sheet independently of the other in the opposite direction, automatically operating means for line spacing said outermost work sheet independently of the underlying work sheet during the said return movement of the outermost work sheet, and automatically operating means for then advancing both work sheets together, whereby the same items written in a plurality of relative short lines on the outermost work sheet are manifolded in a single comparatively long line on the underlying work sheet.

53. In a machine of the character described, the combination of means for printing items on one work sheet and for simultaneously making a manifold copy of such items on an underlying work sheet, automatically operating means for advancing both work sheets together in a letter-feed direction, automatically operating means for returning the outermost work sheet independently of the other in the opposite direction and to an extent that corresponds substantially to the distance said work sheets were advanced together, automatically operating means for line spacing said outermost work sheet independently of the underlying work sheet during the said return movement of the outermost work sheet, automatically operating means for then advancing both work sheets together, and adjustable means for predetermining the distance said work sheets may be advanced together and the distance the outermost work sheet may be returned, whereby the same items written in a plurality of relative short lines on the outermost work sheet are manifolded in a single comparatively long line on the underlying work sheet.

54. The combination of a main carriage, an auxiliary work-sheet-carrying carriage mounted to travel therewith and to receive an independent travel thereon, work sheet feeding means carried by said auxiliary carriage for line spacing the work sheet carried thereby, and automatically operating means controlled by the independent travel of the auxiliary carriage for actuating said work sheet feeding means.

55. The combination of a main carriage, an auxiliary work-sheet-carrying carriage mounted to travel therewith and to receive an independent return travel thereon, work sheet feeding means carried by said auxiliary carriage for line spacing the work sheet carried thereby, automatically operating means controlled by the independent return travel of the auxiliary carriage for actuating said work sheet feeding means, and adjusting means for regulating the extent of line spacing at each automatic operation of said work sheet feeding means.

56. The combination of a platen carriage, an auxiliary work-sheet-carrying carriage mounted to travel with and to receive an independent traveling movement on said platen carriage, means for line spacing said platen, and independent automatically actuated means for line spacing a work sheet on said auxiliary carriage during the independent travel thereof on the main carriage.

57. A machine, having types, for typewriting-manifolding a bill-sheet with a record-sheet, including a carriage for presenting the record-sheet to the types, a truck arranged to present the bill-sheet in manifolding relation to the record-sheet and types, the carriage and truck advancing in unison in letter-feeding direction, tabulating mechanism whereby, following the typing of an item simultaneously on the bill and record sheet, the carriage is advanced preparatory to typing the next item in a different record-sheet column, and means whereby such tabulating advance of the record-sheet carriage automatically causes said bill-truck to be returned, whereby a comparatively wide record-sheet and a comparatively narrow bill-sheet may be printed simultaneously, the entries appearing in one horizontal line on the record-sheet while the same entries are made on the bill-sheet in a plurality of lines, means being provided for line spacing the bill-sheet for the separate lines thereon.

58. A machine, having types, for typewriting-manifolding a bill-sheet with a record-sheet, including a carriage for presenting the record-sheet to the types, a truck arranged to present the bill-sheet in manifolding relation to the record-sheet and types, the carriage and truck advancing in unison in letter-feeding direction, tabulating mechanism whereby, following the typing of an item simultaneously on the bill and record-sheet, the carriage is advanced preparatory to typing the next item in a different record-sheet column, means whereby such tabulating advance of the record-sheet automatically causes said bill-truck to be returned, and automatically operating means for causing the bill-sheet to be line spaced on each of said return movements of the bill-truck, whereby a comparatively wide record-sheet and a comparatively narrow bill-sheet may be printed simultaneously, the entries appearing in one horizontal line on the record-sheet while the same entries are made on the bill-sheet in a plurality of lines.

59. A machine, having types, for typewriting-manifolding a bill and record-sheet, including a letter-feeding carriage for presenting the record-sheet to the types, a truck arranged to present the bill-sheet in manifolding relation to the record-sheet and types, means coupling said carriage and truck for joint letter-feeding movement, and operable to effect a change in the relative positions of said carriage and truck for typing items in different columns alongside one another in a single horizontal line on a comparatively wide record sheet and simultaneously typing the same items in a plurality of lines on a comparatively narrow bill sheet, and means whereby the carriage movement in advancing successive columns of the record-sheet to the printing zone automatically operates said coupling means to bring about a change in the relative positions of said carriage and truck, and thereby collate the entry column on bill-sheet successively with the record-sheet columns, means being provided for line-spacing the bill-sheet independently of the record-sheet.

60. A machine, having types, for typewriting-manifolding a bill and record-sheet, including a letter-feeding carriage for presenting the record-sheet to the types, a truck arranged to present the bill-sheet in manifolding relation to the record-sheet and types, means coupling said carriage and truck for joint letter-feeding movement, and operable to bring about a change in the relative positions of said carriage and truck for typing items in lines one under another on the bill-sheet and at the same time typing said items in different columns alongside one another in a single line on the record-sheet, means whereby the carriage movement in advancing successive columns of the record-sheet to the printing-zone automatically operates said coupling means to change the relative positions of said carriage and truck, and thereby collate the bill-sheet entry space successively with the record-sheet columns, and means, associated with said truck, and arranged so as to be automatically effective to line-space the bill-sheet when the relative positions of said carriage and truck are changed by said column advancing carriage movement.

61. In a typing machine, the combination of a tabulating carriage for a record-sheet upon which different items are typed in a single horizontal line and in vertical columns, a truck constantly urged to move lengthwise of said carriage in a direction opposite to the tabulating movement of the latter, and arranged to present a second work-sheet in manifolding relation to the record-sheet, the items typed in said horizontal line being simultaneously typed on said second sheet in lines one below the other, a series of stops for restraining the truck and determining, by means of one or another thereof, the position of the truck relative to said carriage, said truck and carriage being coupled by means of said stops to advance in unison for letter-feeding, and tappet-means whereby the carriage, by its movement to tabulate successive columns of the record-sheet to the printing-zone, automatically causes said truck to be repositioned relatively to said carriage by means of said stops, whereby, as a column of the record-sheet is tabulated to the printing-zone, the second work-sheet is automatically collated with said record-sheet.

62. In a typing machine, the combination with the types, of a tabulating carriage arranged to present to the types a record-sheet having a plurality of item-classifying columns, a truck constantly urged lengthwise of said carriage and arranged for presenting a bill-sheet, having a comparatively narrow printing field in which items are entered in lines one below the other, in manifolding relation to said record-sheet, a plurality of stops and a counter-stop normally engaged with one or another of said stops for restraining said bill-sheet truck, said stops and the counter-stop being relatively movable for disengagement and re-engagement, whereby the truck moves from a position determined by one stop to a position determined by a succeeding stop, and means whereby said relative movement of the stops and counter-stop to bring about a shift of the truck relative to the carriage is automatically effected by a carriage movement after the carriage is tabulated whereby, in accordance with the typing of an item in the comparatively narrow printing field on the bill-sheet said bill-sheet field is collated with the corresponding column of the record-sheet, means being provided for line-spacing the bill-sheet.

63. In a typing machine, the combination with the types, of a tabulating carriage arranged to present to the types a record-sheet having a plurality of item-classifying columns, a truck constantly urged lengthwise of said carriage and arranged for presenting a bill-sheet, having a comparatively narrow printing field in which items are entered in lines one below the other, in manifolding relation to said record-sheet, a plurality of stops and a counter-stop normally engaged with one or another of said stops for restraining said bill-sheet truck, said stops and the counter-stop being relatively movable for disengagement and re-engagement whereby the truck is rendered effective to move from a position determined by one stop to a position determined by a succeeding stop, means whereby said relative movement of the stops and counter-stop to bring about a shift of the truck relative to the carriage is automatically effected by the carriage movement after the carriage is tabulated, whereby, in accordance with the typing of each line in the bill-sheet field said bill-sheet field is collated with the corresponding column of the record-sheet, and means whereby said shift of the truck relative to the carriage automatically causes the bill-sheet to be line-spaced.

64. In a typing machine, the combination with the types, of a tabulating carriage arranged to present to the types a record-sheet having a multiplicity of item-classifying columns spaced crosswise of the record-sheet, a truck for presenting a bill-sheet, having a comparatively narrow printing field in which items are typed in lines one below the other, in manifolding relation to said record-sheet, said truck being movable lengthwise of the carriage for locating the bill-truck at different positions relatively to the record-sheet, lengthwise of the carriage, automatically operating means for thus moving the truck lengthwise of the carriage, and means whereby the movements of the truck in its shifts to successive positions automatically causes the bill to be uniformly line-spaced.

65. In a machine, having types, for typewriting-manifolding a bill-sheet with a record-sheet, the combination of a letter-feeding carriage for the record-sheet, a truck for the bill-sheet, means for effecting a coupling of the truck to said carriage in different positions relative to the latter, so that items typed in a plurality of lines one below another in a comparatively narrow printing field on the bill-sheet are at the same time manifolded alongside one another in different columns on the record-sheet, tabulator mechanism, means controlled thereby for tabulating the record-sheet carriage to bring successive columns on the record-sheet to the printing point, and automatically operating means for controlling said coupling means to bring about a shifting of said truck relative to said record-sheet carriage to position the relatively narrow printing field on the bill-sheet with reference to the printing point and record-sheet, means being provided to automatically line space the bill-sheet.

FREDERICK A. HART.